US012338653B1

(12) United States Patent
Case et al.

(10) Patent No.: US 12,338,653 B1
(45) Date of Patent: Jun. 24, 2025

(54) LOCK CORES AND KEYS

(71) Applicant: Innovate, LLC, Fishers, IN (US)

(72) Inventors: Christopher Case, Fishers, IN (US); Douglas McIntyre, Spring, TX (US); Jeffery Brannum, Lapel, IN (US)

(73) Assignee: Innovate LLC, Houston, TX (US)

( * ) Notice: Subject to any disclaimer, the term of this patent is extended or adjusted under 35 U.S.C. 154(b) by 0 days.

(21) Appl. No.: 18/912,733

(22) Filed: Oct. 11, 2024

Related U.S. Application Data

(60) Provisional application No. 63/614,728, filed on Dec. 26, 2023.

(51) Int. Cl.
*E05B 27/00* (2006.01)
*E05B 27/08* (2006.01)

(52) U.S. Cl.
CPC ...... *E05B 27/0042* (2013.01); *E05B 27/0007* (2013.01); *E05B 27/083* (2013.01)

(58) Field of Classification Search
CPC ............. E05B 19/0017; E05B 19/0023; E05B 19/0029; E05B 19/0041; E05B 19/0052; E05B 19/0058; E05B 19/0064; E05B 19/007; E05B 27/00; E05B 27/0042; E05B 27/0007; E05B 27/083; Y10T 70/787; Y10T 70/7881
USPC ........................................... 70/493, 407, 409
See application file for complete search history.

(56) References Cited

U.S. PATENT DOCUMENTS

| | | | | |
|---|---|---|---|---|
| 1,892,419 A | | 12/1932 | Best | |
| 1,905,177 A | | 4/1933 | Kirwood | |
| 1,971,596 A | | 8/1934 | Brauning | |
| 2,035,181 A | | 3/1936 | Molinare | |
| 2,049,548 A | | 8/1936 | Swanson | |
| 2,157,142 A | * | 5/1939 | Olson | E05B 29/00 70/406 |
| 2,197,673 A | * | 4/1940 | Albertz | E05B 27/00 70/358 |
| 3,303,677 A | * | 2/1967 | Bauer | E05B 27/00 70/378 |
| 3,722,240 A | | 3/1973 | Oliver et al. | |
| 3,863,473 A | * | 2/1975 | Neale | B60R 25/02121 70/357 |
| 4,424,693 A | | 1/1984 | Best et al. | |
| 4,635,455 A | | 1/1987 | Oliver | |
| 4,638,651 A | | 1/1987 | Surko, Jr. | |
| 4,723,427 A | | 2/1988 | Oliver | |
| 4,836,001 A | | 6/1989 | Foshee | |
| 5,176,015 A | | 1/1993 | Sussina | |
| 5,778,712 A | | 7/1998 | Wallden | |
| 5,943,890 A | | 8/1999 | Field et al. | |
| 6,079,240 A | | 6/2000 | Shvarts | |
| 6,105,404 A | | 8/2000 | Field et al. | |

(Continued)

FOREIGN PATENT DOCUMENTS

| | | | | |
|---|---|---|---|---|
| AT | 385076 B | * | 2/1988 | |
| AT | 396706 B | * | 9/1993 | E05B 19/0035 |

(Continued)

*Primary Examiner* — Suzanne L Barrett

(57) ABSTRACT

A lock core and key assembly includes a core body, a core plug having a core plug insert-receiving aperture, a core plug insert positioned in the core plug insert-receiving insert, and a key. The core plug insert has a taper and the key has a bow and a shank with a taper that aligns with the taper of the core plug insert.

17 Claims, 20 Drawing Sheets

(56) References Cited

U.S. PATENT DOCUMENTS

| | | | | |
|---|---|---|---|---|
| 6,477,875 | B2 | 11/2002 | Field et al. | |
| 6,526,791 | B2 | 3/2003 | Shvarts | |
| 6,668,606 | B1 | 12/2003 | Russell et al. | |
| 6,945,082 | B2 | 9/2005 | Field et al. | |
| 7,207,200 | B2 | 4/2007 | Eden, Jr. et al. | |
| 7,412,860 | B1 | 8/2008 | Field et al. | |
| 7,681,425 | B2 | 3/2010 | Teixeira | |
| 7,797,973 | B2 | 9/2010 | Field et al. | |
| 8,061,168 | B2 | 11/2011 | Widén | |
| 8,186,194 | B2 | 5/2012 | Field et al. | |
| 8,690,203 | B1 | 4/2014 | Hickman et al. | |
| 9,045,915 | B2 | 6/2015 | Field et al. | |
| 9,127,480 | B2 | 9/2015 | Mathachan | |
| 9,482,031 | B2 | 11/2016 | Field et al. | |
| 9,771,738 | B2 | 9/2017 | Field et al. | |
| 10,337,210 | B2 | 7/2019 | Widén | |
| 10,480,215 | B2 | 11/2019 | Zuraski et al. | |
| 11,536,047 | B1 * | 12/2022 | Widén | E05B 19/007 |
| 11,613,909 | B1 * | 3/2023 | Widén | E05B 27/02<br>70/493 |
| 2006/0230797 | A1 | 10/2006 | Strong et al. | |
| 2009/0241620 | A1 | 10/2009 | Field et al. | |
| 2012/0240644 | A1 | 9/2012 | Teixeira | |

FOREIGN PATENT DOCUMENTS

| | | | | |
|---|---|---|---|---|
| AT | 8146 | U1 * | 2/2006 | |
| AU | 2022289158 | A1 * | 11/2023 | E05B 15/06 |
| CA | 2154328 | | 1/1996 | |
| CN | 1069940 | | 8/2001 | |
| DE | 3603687 | A1 * | 8/1987 | |
| DE | 4109968 | A1 * | 9/1992 | |
| DE | 4333678 | A1 * | 5/1995 | E05B 27/00 |
| DE | 102010012261 | A1 * | 9/2011 | E05B 27/0042 |
| DE | 102018107501 | | 7/2018 | |
| EP | 0623719 | A2 * | 4/1994 | |
| EP | 1355023 | A1 * | 10/2003 | E05B 27/0042 |
| EP | 073314581 | | 5/2004 | |
| EP | 4234852 | A1 * | 8/2023 | E05B 19/0017 |
| EP | 3822434 | | 2/2024 | |
| EP | 3822434 | B1 * | 2/2024 | B21D 53/42 |
| EP | 4379172 | A1 * | 6/2024 | E05B 19/0035 |
| SK | 501122016 | | 9/2017 | |
| TW | 201432128 | | 8/2014 | |
| WO | 2006066019 | | 6/2006 | |
| WO | 2008133696 | A1 | 11/2008 | |
| WO | 2013169954 | | 11/2013 | |

* cited by examiner

LOCK CORES AND KEYS

RELATED APPLICATIONS

The present application claims the benefit of U.S. Provisional Patent Application Ser. No. 63/614,728, titled "Lock Cores and Keys," filed Dec. 26, 2023, to Case et al., the entire disclosure of which is expressly incorporated by reference herein.

TECHNICAL FIELD

The present disclosure is directed to lock cores and keys.

BACKGROUND AND SUMMARY OF THE DISCLOSURE

The following statements are intended to facilitate an understanding of the present disclosure. The statements are to be read in this light and should not be construed as admissions of prior art.

Lock cores and keys are used to lock and unlock items, such as doors, containers, etc. Lock cores may be provided in door lock sets, pad locks, etc. Unless an authorized key is inserted into a core body, tumbler pins block rotation of the core plug relative a core body. When an authorized key is inserted into the core body, the tumbler pins align properly, allowing rotation of the core plug relative to the core body and unlocking of the lock. Additional disclosure of such locks is provided in U.S. Patent Application Ser. No. 60/610,639, to Hickman et al., entitled Mortise Lock, U.S. Patent Application Ser. No. 60/635,839, to Strong et al., entitled Lock core, U.S. Pat. No. 4,424,693, to Best et al., entitled Key-Removable Lock Core, U.S. Pat. No. 4,836,001, to Foshee, entitled High Security Lock, and U.S. Pat. No. 6,668,606, to Russell et al., entitled Electronic Token Lock Core, U.S. Provisional Patent Application Ser. No. 60/718,519, entitled "Key and Core", filed Sep. 19, 2005, to Strong et al. and U.S. Provisional Patent Application Ser. No. 60/845,647, entitled "Key and Core", filed Sep. 19, 2006, to Strong et al. the entire disclosures of which are incorporated by reference herein.

According to one aspect of the present disclosure, a key is provided having a shank with one or more taper surfaces. According to another aspect of the present disclosure, a key is provided having a plurality of lugs. According to another aspect of the present disclosure, a key is provided with teeth extending from an insertion end of the key and shuttles configured to receive the teeth. Suitable lock cores are provided for use with the keys.

According to other aspects of the present disclosure, an interchangeable lock core and key assembly is provided. The assembly includes a core body having a plurality of pin- and spring-receiving apertures and a plurality of ejector pin-receiving apertures in line with the plurality of pin- and spring-receiving apertures and sized to receive an ejector pin. The assembly further includes a core plug positioned in the core body and having a longitudinal axis, a first end, a second end longitudinally spaced apart from the first end, a side wall extending between the first and second ends of the core plug, a plurality of pin-receiving apertures in line with the pin- and spring receiving apertures of the core body, a keyway, and a core plug insert-receiving aperture positioned in the side wall between the first and second ends of the core plug, the keyway having an opened end positioned on the first end of the core plug and sized to receive a key. The assembly further includes plurality of pins positioned in the pin- and spring-receiving apertures of the core body and the pin-receiving apertures of the core plug and a plurality of springs positioned in the pin- and spring-receiving apertures of the core body to urge the plurality of pins towards the core plug. The assembly further includes a core plug insert positioned in the core plug insert-receiving aperture and having a longitudinally extending, tapered surface defining at least a portion of the keyway, and a key having a bow and a shank coupled to the bow. The shank is positioned in the keyway. The key has bitting configured to interact with the plurality of pins to align the plurality of pins so that the core plug can rotate relative to the core body and a longitudinally extending, tapered surface that aligns with the longitudinally extending, tapered surface of the core plug insert.

According to another aspect of the present disclosure, another interchangeable lock core and key assembly is provided. The assembly includes a core body having a plurality of pin- and spring-receiving apertures and a plurality of ejector pin-receiving apertures in line with the plurality of pin- and spring-receiving apertures and sized to receive an ejector pin. The assembly further includes a core plug positioned in the core body an having a longitudinal axis, a first end, a second end longitudinally spaced apart from the first end, a longitudinal length extending from the first end of the core plug to the second end of the core plug, a side wall extending between the first and second ends of the core plug, a plurality of pin-receiving apertures in line with the pin- and spring-receiving apertures of the core body, a keyway, and a core plug insert-receiving aperture positioned in the side wall between the first and second ends of the core plug, the keyway having an opened end positioned on the first end of the core plug and sized to receive a key. The assembly further includes a plurality of pins positioned in the pin- and spring-receiving apertures of the core body and the pin-receiving apertures of the core plug, and a plurality of springs positioned in the pin- and spring-receiving apertures of the core body to urge the plurality of pins towards the core plug. The assembly further includes a core plug insert positioned in the core plug insert-receiving aperture having a longitudinally extending, tapered surface defining at least a portion of the keyway, the longitudinally extending, tapered surface of the core plug insert having a longitudinal length of at least a quarter of the length of the length of the core plug. The assembly further includes a key having a bow and a shank. The shank is positioned in the keyway. The key has bitting configured to interact with the plurality of pins to align the plurality of pins so that the core plug can rotate relative to the core body and a longitudinally extending, tapered surface that aligns with the longitudinally extending, tapered surface of the core plug insert.

According to another aspect of the present disclosure, a method of assembling an interchangeable lock core is provided. The method includes the steps of providing a core body, a core plug, and a cored plug insert. The core body has a plurality of pin- and spring-receiving apertures and a plurality of ejector pin-receiving apertures in line with the plurality of pin- and spring-receiving apertures and sized to receive an ejector pin. The core plug has a longitudinal axis, a first end, a second end longitudinally spaced apart from the first end, a side wall extending between the first and second ends of the core plug, a plurality of pin-receiving, a keyway, and a core plug insert-receiving aperture positioned in the side wall between the first and second ends of the core plug. The keyway has an opened end positioned on the first end of the core plug and sized to receive a key. The core plug insert has a longitudinally extending, tapered surface. The method further includes positioning the core plug in core body with the plurality of pin-receiving apertures in line with the pin- and spring-receiving apertures of the core body and positioning the core plug insert into the core plug insert-receiving aperture of the core plug with the longitudinally extending, tapered surface of the core plug insert defining at least a portion of the keyway. The keyway has a profile configured to match a profile of a key configured to unlock the interchangeable lock to allow the core plug to rotate relative to the core body.

Additional features of the present disclosure will become apparent to those skilled in the art upon consideration of the following detailed description of the illustrative embodiment exemplifying the best mode of carrying out the disclosure as presently perceived.

BRIEF DESCRIPTION OF THE DRAWINGS

The detailed description of the drawings particularly refers to the accompanying figures in which.

Figure 1:
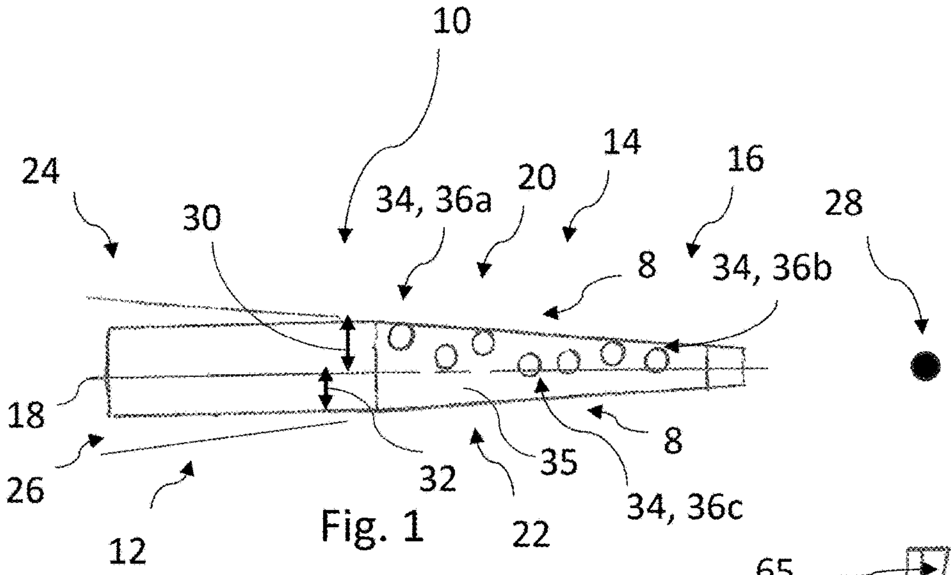
FIG. 1 is a top view of a key blank having bow and tapered key shank.

For the purposes of promoting an understanding of the principals of the disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings. Unless otherwise indicated or apparent, the components shown in the figures are proportional to each other. It will be understood that no limitation of the scope of the disclosure is thereby intended. The disclosure includes any alterations and further modifications in the illustrative devices and described methods and further applications of the principles of the disclosure, which would normally occur to one skilled in the art to which the disclosure relates.

DETAILED DESCRIPTION OF THE DRAWINGS

Figure 2:
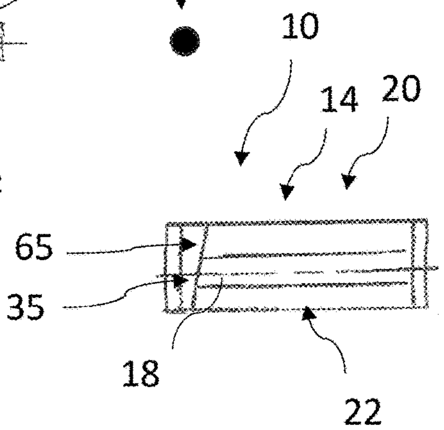
FIG. 2 is an end view of the key blank of FIG. 1.
Figure 3:
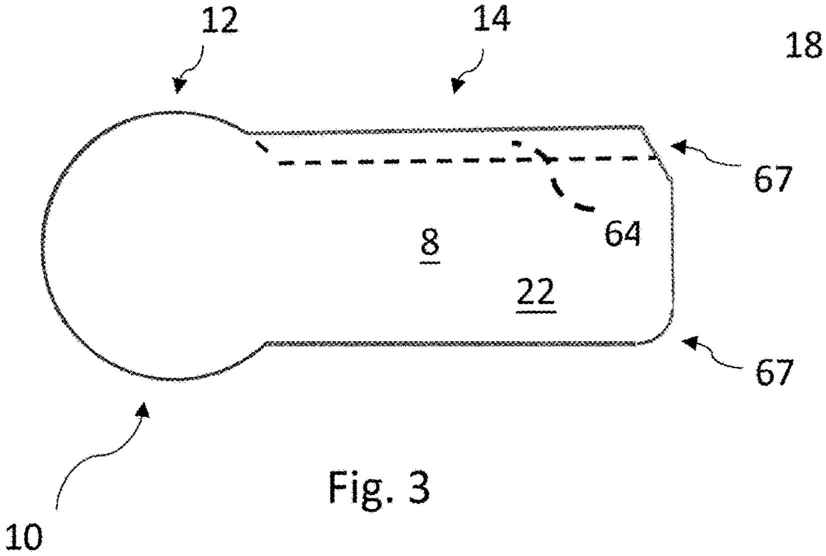
FIG. 3 is a side view of the key blank of FIG. 1 showing an insertion end of the key shank having truncated corners.
Figure 6:
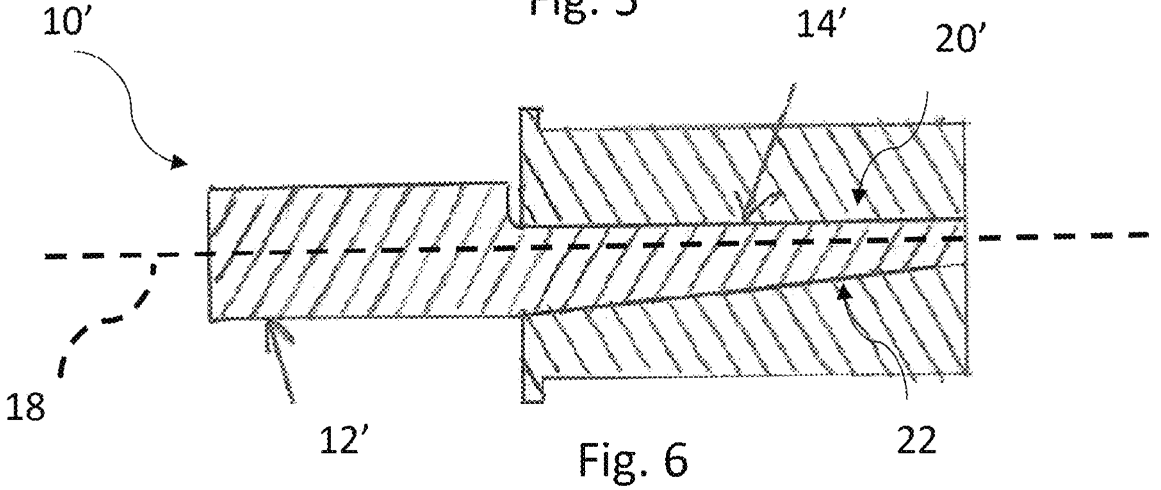
FIG. 6 is a cross-sectional view of an alternative embodiment key blank with a tapered key shank and interchangeable lock core.
Figure 7:
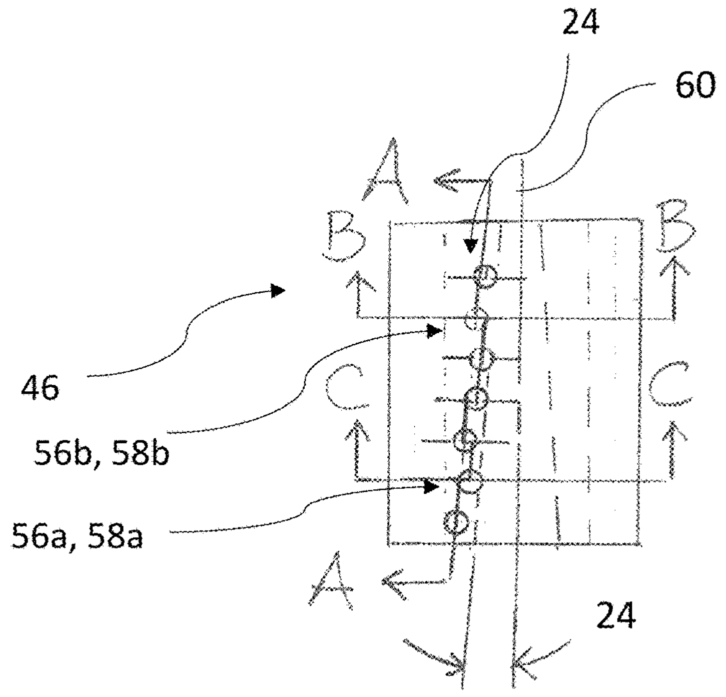
FIG. 7 is a top view of the interchangeable lock core of FIG. 4.
Figure 8:
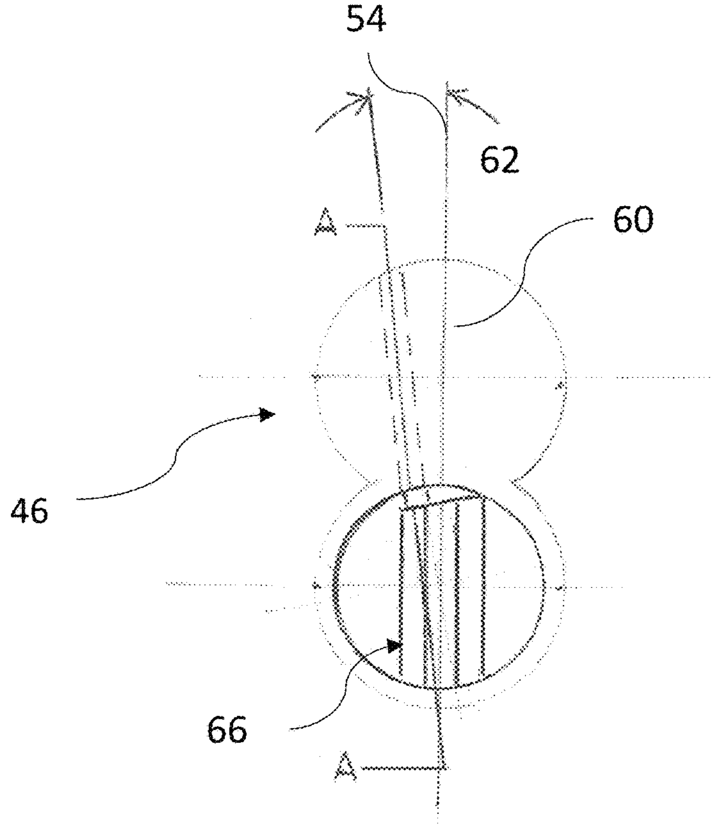
FIG. 8 is an end view of the interchangeable lock core of FIG. 4.
Figure 9:
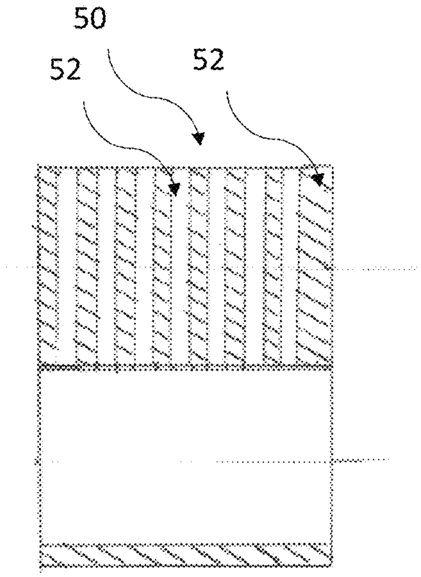
FIG. 9 is cross-sectional view taken along line A-A of FIGS. 7 and 8.
Figure 10:
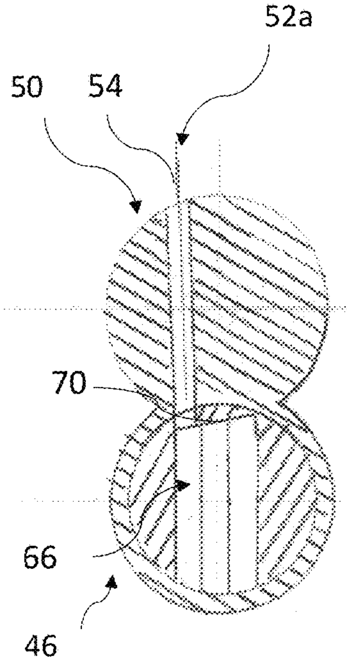
FIG. 10 is a cross-sectional view taken along line C-C of FIG. 7.
Figure 11:
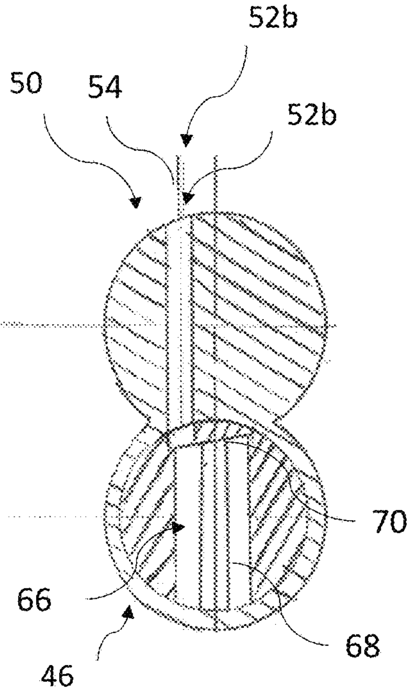
FIG. 11 is another cross-sectional view taken along line B-B of FIG. 7.
Figure 12:
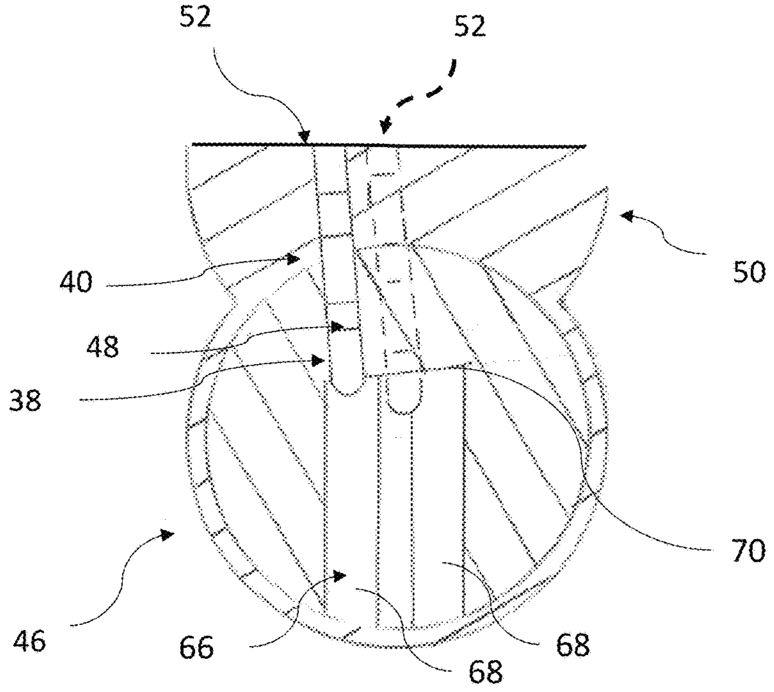
FIG. 12 is an enlarged cross-sectional view of the interchangeable lock core of FIG. 4.

As shown in FIGS. 1-3, a key blank 10 is provided having a bow 12 and a key shank 14. Key shank 14 tapers along its length on each side relative to longitudinal axis 18. These side taper surfaces 8 preferrable extend from adjacent to bow 12 to near insertion end 16. As shown in FIG. 1, side tapers/tapered surfaces 8 are provided on first/left and second/right sides 20, 22. However, according to alternative embodiments, one side tapered surface 8 may be provided only on left side 20 so that the right side does not taper relative to longitudinal axis 18 or one side tapered surface 8 may only be provided on right side 22 so that the left side 20' does not taper relative to longitudinal axis 18, as shown in FIG. 6.

According to the example embodiment, angles 24, 26 of side taper surfaces 8 are about 7° between left and right sides 20, 22 and longitudinal axis 18, respectively providing 140 of difference therebetween. However, according to alternative embodiments, the angles of side taper surfaces 8 of key 10, and the other keys described herein, may be larger or smaller, such as 1°, 2°, 3°, 4°, 5°, 6°, 8°, 9°, 10°, 11°, 12°, 13°, 15°, 18°, 20°, 25°, 30°, 35°, etc. The angles may also not be tapered, such as 0°.

Although in the example embodiment, angles 24, 26 of side taper surfaces 8 are equal (0° degrees different) in magnitude relative to longitudinal axis 18, they may be different. For example, one angle may be 7° in magnitude relative to longitudinal axis 18 and the other angle may be 9° relative to longitudinal axis 18 (2° degrees more), providing 16° of difference therebetween. Additional examples of different angles of side taper surfaces 8 in magnitude relative to longitudinal axis 18 include 1° (e.g. one angle of one side taper 8 at 7° relative to longitudinal axis 18 and the other angle of the other side taper 8 at 60 relative to longitudinal axis 18), 2° (e.g. one angle of one side taper 8 at 4° relative to longitudinal axis 18 and the other angle of other side taper 8 at 6° relative to longitudinal axis 18), 3°, 4°, 5°, 6°, 8°, 9°, 10°, 11°, 12°, 13°, 14°, 15°, 18°, 20°, 25°, 30°, 35°, etc.

Although in the example embodiment, angles 24, 26 of side taper surfaces 8 meet at a vertex 28 to the left of insertion end 16 on longitudinal axis 18 as shown in FIG. 1, they could meet elsewhere. For example, if the magnitude of angles 24, 26 relative to longitudinal axis 18 are different, as discussed herein, vertex 28 will not be on longitudinal axis 18. If angle 24 is greater than angle 26 with thickness 30 of left side 20 being equal to thickness 32 of right side 22, vertex 28 will be below longitudinal axis 18 as oriented in FIG. 1 and to the left of insertion end 16. If angle 24 is less than angle 26 with thickness 30 of left side 20 being equal to thickness 32 of right side 22, vertex 28 will be above longitudinal axis 18 as oriented in FIG. 1 and to the left of insertion end 16.

Although in the example embodiment, thickness 30 of left side 20 is equal to thickness 32 of right side 22, providing a ratio of thickness 30 to thickness 32 of 1.0, thicknesses 30, 32 may not be equal, providing a ratio of thickness 30 to thickness 32 that is not 1.0. For example, thickness 30 of right side 22 may be greater or less than thickness 32 of right side 22. Thus, the ratio of thickness 30 to thickness 32 may be more or less than 1.0, such as 0.1, 0.2, 0.3, 0.4, 0.5, 0.6, 0.7, 0.8, 0.9, 1.1, 1.2, 1.3, 1.4, 1.5, 2, 4, 6 8, 10, etc.

As shown in FIG. 1, bitting 34 is milled or otherwise provided in tops 35 of right and left sides 20, 22 of key blank 12. When milled, key blank 12 may be also be referred to as a bitted key. Bitting 34 may be a rounded dimple-shaped recess 36 sized to receive a rounded end of a tumbler/shear pin 38. Recesses 36 may have different depths. If a recess 36 is the correct depth and position relative to a respective set of shear pins 38 and key shank 14 is fully inserted into core plug 42 of interchangeable lock core 46, a split 48 between shear pins 38 align with a shear line 40 between core plug 42 and core body 50 of interchangeable lock core 46. If all recesses 36 are the correct depth to align shear lines 40 of respective shear pins 38, core plug 42 can be rotated relative to core body 50.

As shown in FIG. 1, a perpendicular distance between longitudinal axis 18 and recesses 36 varies along the length of key blank 12. For example, recess 36*a* is farther from longitudinal axis 18 than recess 36*b*, which is farther from longitudinal axis 18 than recess 36*c*, etc. Similarly, a perpendicular distance between recesses 36 and side taper surfaces 8 can vary along the length of key blank 12. For example, recess 36*a* is closer to side taper 8 than recess 36*b*, which is farther from side taper 8 than recess 36*c*, etc.

Figure 13:
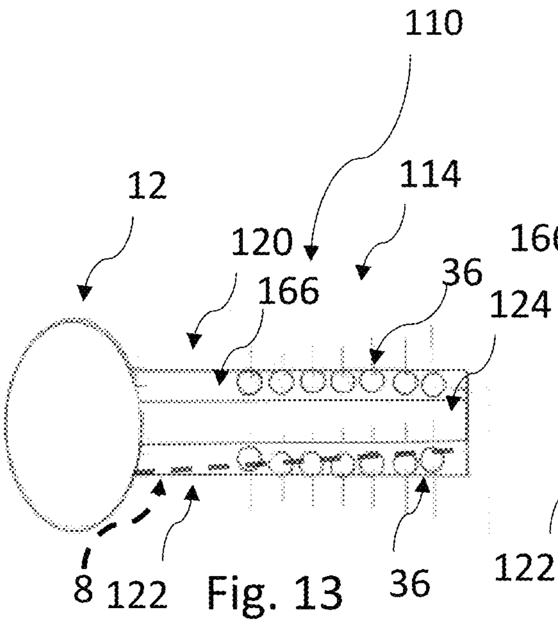
FIG. 13 is a side view of a key blank having a bow and key shank with right and left extension and upper and lower extensions with bitting, cooperating together to define a cross-shape.

According to some embodiments, recesses 36 may form a pattern. For example, recesses may form a straight line so that as the thickness of right side 20 decreases, recesses 36 are closer to longitudinal axis 18 or recesses 34 may form a curve as shown in FIG. 13 for an alternative embodiment key blank.

Figure 5:
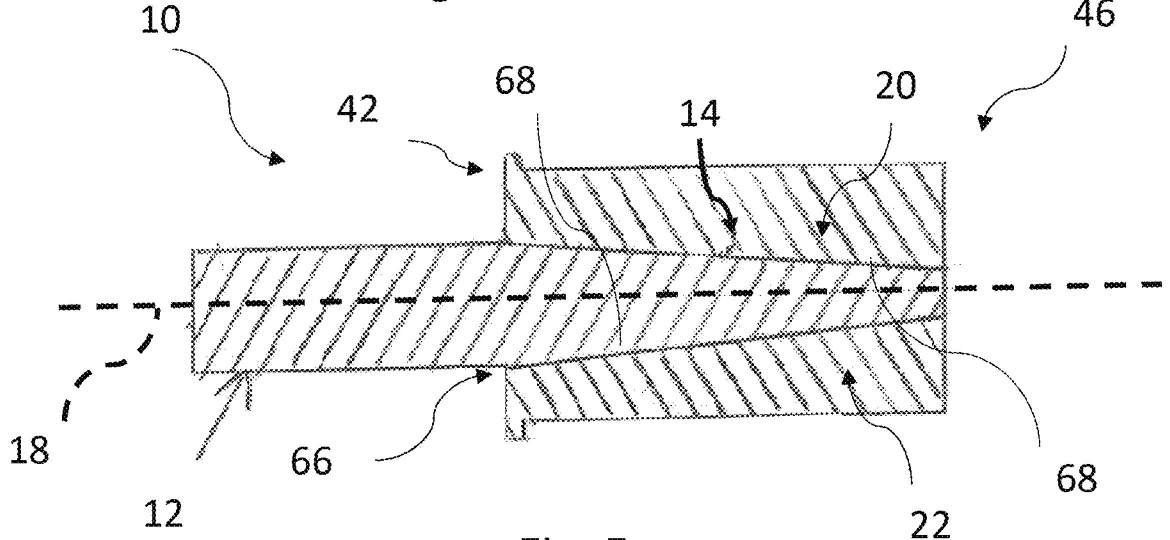
FIG. 5 is a cross-sectional view of the interchangeable lock core of FIG. 4.

As shown in FIG. 5, core plug 42 and core body 50 include pin apertures 52 sized to receive shear pins 38 and springs (not shown) positioned to bias shear pins 38 toward core plug 42. Each pin aperture 52 has an axis 54 that varies in position and angle based on the position of recesses 36 of key blank 12 relative to longitudinal axis 18 of key blank 12. For example, an opening 56*a* of first pin aperture 52*a* along first axis 54*a* has an outer end 58*a* that is further away from a vertical plane 60 of core body 50 than an opening 56*b* of second pin aperture 52*b* along second axis 54*b*. Angles 62 between axes 54 and vertical plane 58 may be different. For example, an angle between an axis of pin aperture 52*a* and vertical plane 58 is greater than an angle between an axis of pin aperture 52*b* and vertical plane 58.

Recesses 36 are preferably aligned with axes 54 of pin apertures 52 so that axes 54 extend through a center of recesses 36, such as the tips of rounded recess 36. If axes 54 are not aligned, the orientation of recesses 36 may differ. For example, the orientation of recess 36*a* relative to vertical plane 58 is different than the orientation of recess 36*b* relative to vertical plane 58.

In addition to side taper surfaces 8 on right and left sides 20, 22, key blank 12 may taper on portions of top 35 as shown in FIG. 2, having top taper 65. Preferrable, each portion of top taper 65 is perpendicular to the respective axes 54 of pin apertures 52 that pass through the respective portion of top taper 65. These portions of top taper 65 may align to define a plane or these may not be aligned. Additionally, insertion end 16 of key shank 14 may have flat or rounded tapered corners 67 to facilitate insertion of key shank 14 into core plug 52 as shown in FIG. 3.

Figure 4:
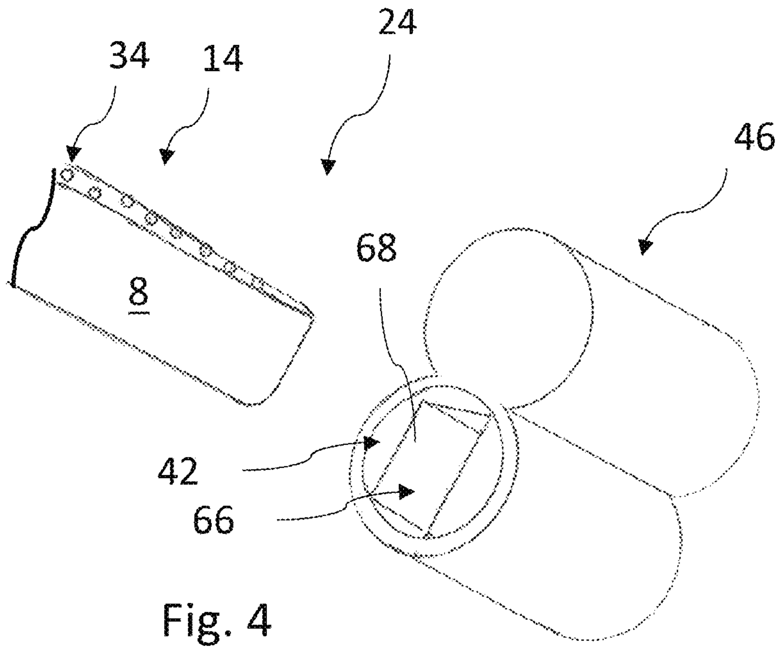
FIG. 4 is a perspective view of a portion of the key blank of FIG. 1 aligned for insertion into an interchangeable lock core.

As shown in FIGS. 4 and 5, core plug 52 includes a recess/keyway 66 sized to receive and match key shank 14. Keyway 66 includes tapered side walls/surfaces 68 that match side taper surfaces 8 of side walls 20, 22. Keyway 66 includes a tapered top wall/surface 70 to match top taper 65 of top 35 of key shank 14.

Figure 14:
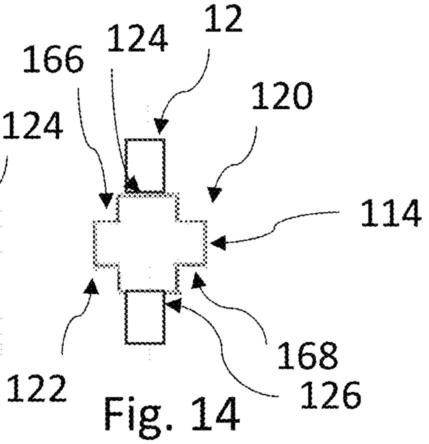
FIG. 14 is an end view of the cross-shaped key shank of FIG. 3.
Figure 15:
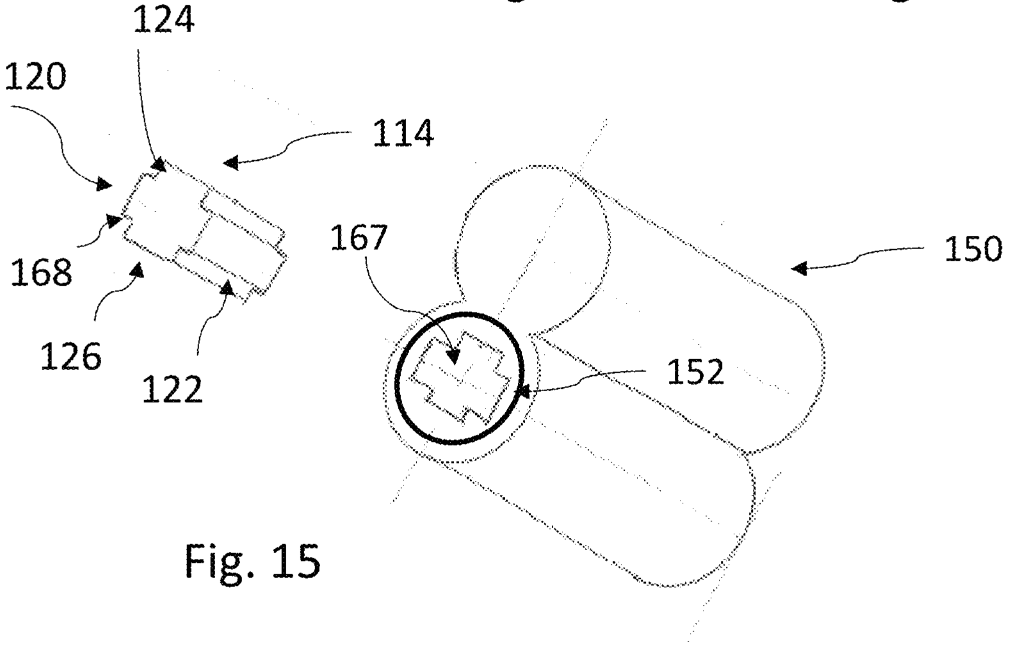
FIG. 15 is a perspective view of a portion of the cross-shaped key shank of FIG. 13 aligned for insertion into an interchangeable lock core.

As shown in FIGS. 13-15, another key blank 110 is provided having a bow 12 and a key shank 114. Key shank 114 has right, left, top, and bottom lugs 120, 122, 124, 126. Top and bottom sides 166, 168 of right and left lugs 120, 122 may be bitted to includes recesses 36, which may vary in depth as discussed herein to assist with aligning shear pins 38, allowing core plug 152 to rotate relative to core body 150 if a matching bitted key is inserted into core plug 152. Core body 150 and core plug 152 include two sets of pin aperture 153, one set on the right side of core body 150 to align with recesses 36 on right lug 120 and one set on the left side of core body 150 to align with recesses 36.

Figure 16:
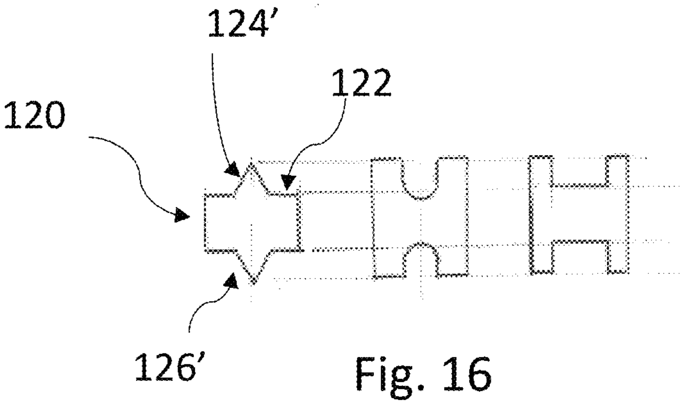
FIG. 16 shows end views of an alternative embodiment key shanks.
Figure 18:
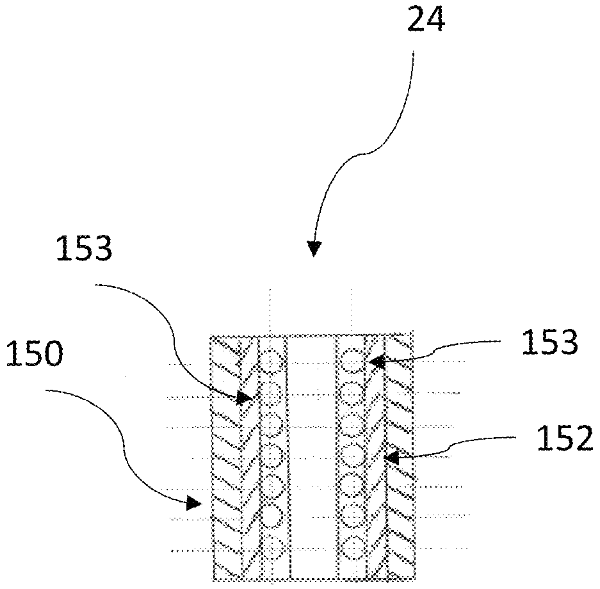
FIG. 18 is a sectional view taken along line A-A of FIG. 17.
Figure 19:
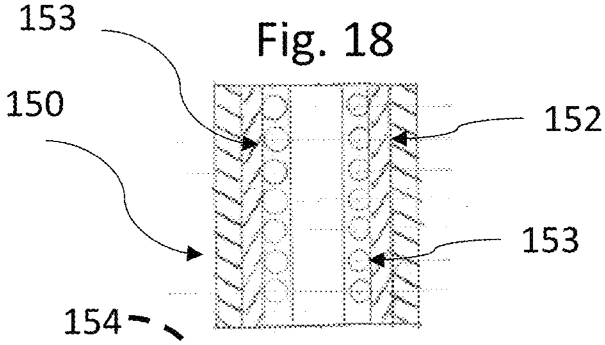
FIG. 19 is a sectional view taken along line B-B of FIG. 17.
Figure 17:
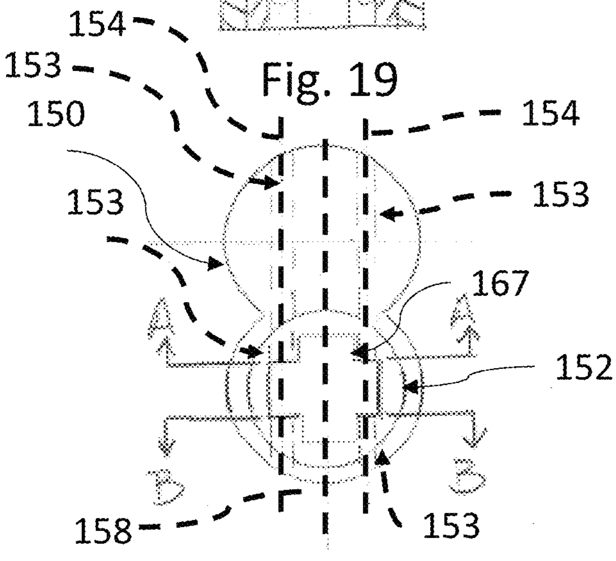
FIG. 17 is an end view of the interchangeable lock core of FIG. 15.

Right, left, top, and bottom lugs 120, 122, 124, 126 are 90° apart and rectangular in cross-section to cooperate in defining a cross shape. As shown in FIGS. 15 and 17, core plug 152 includes a cross-shaped recess 167 sized to receive and match key shank 114. Right, left, top, and bottom lugs 120, 122, 124, 126 may be oriented at angles other than 90° apart and have cross-sections other than rectangular. As shown in FIG. 16, alternative embodiment cross-sections of key shanks are provided have a cross-shape having triangular top and bottom lugs 124', 126', an H-shape having flat sides an U-shaped groove, and an H-shape having a rectangle-shaped groove. Any of the left, right, top, and bottom surfaces of these alternative embodiments may have recesses 36 to receive shear pins 38 as discussed herein and plug bodies may be provided having recesses sized to receive and match the cross-section of key shanks of these alternative embodiments.

Right and left lugs 120, 122 (e.g. see taper 8 FIG. 13 shown in phantom for lug 122) of key shank 114 and alternative embodiments key shanks of FIG. 16 may be tapered as discussed herein for side taper surfaces 8 so that right and left lugs 120, 122 change thickness as they extend from adjacent to bow 12 to insertion end 116. Tops 135 of right and left lugs 120, 122 of key shank 114 and tops of alternative embodiment key shanks of FIG. 16 may be tapered like top 35 of key shank 14, preferably being perpendicular to axes 154 of pin apertures 152 provided in plug and core bodies.

Recesses 36 on kitty-corner sides of key shank 114 may be identical in depth. For example, as shown in FIG. 14, recesses 36 of upper left side 166 of key shank 114 are identical in position and depth to respective recesses 36 of lower right side 168 of key shank 114 so key shank 114 will align shear pins 38 if inserted into recess 167 as aligned in FIG. 15 or rotated 180° and inserted into recess 167. Similarly, top and bottoms of key blank 110 are preferably mirror images of each other.

According to some embodiments, recesses 36 in key shank 114 may form a pattern. For example, recesses may form a straight line or a curved line as shown in left and right lugs 120, 122. As discussed herein for axes 54 of key blank 10, axes 154 of pin apertures 152 of key blank 110 may have different angles 162 relative to vertical plane 58 based on the position of recesses 36 relative to vertical plane 58.

Figure 20:
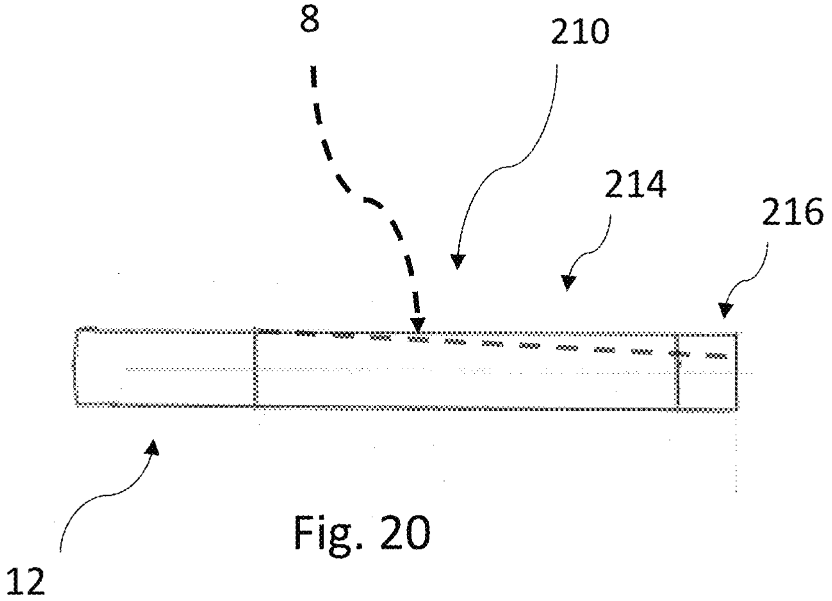
FIG. 20 is a top view of a key blank having bow and key shank with teeth extending from an insertion end of the key shank.
Figure 21:
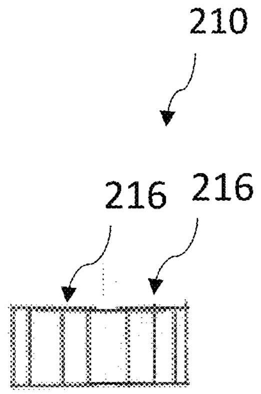
FIG. 21 is an end view of the key blank of FIG. 20.
Figure 22:
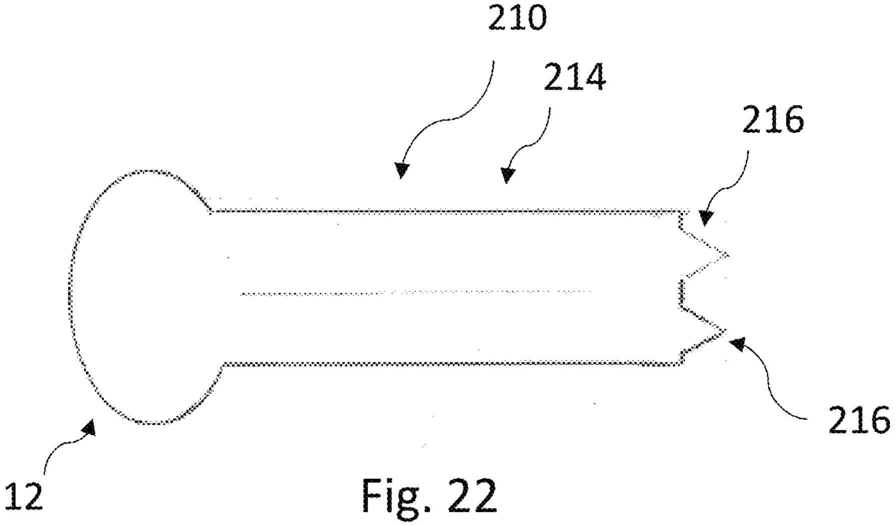
FIG. 22 is a side view of the key blank of FIG. 20.
Figure 23:
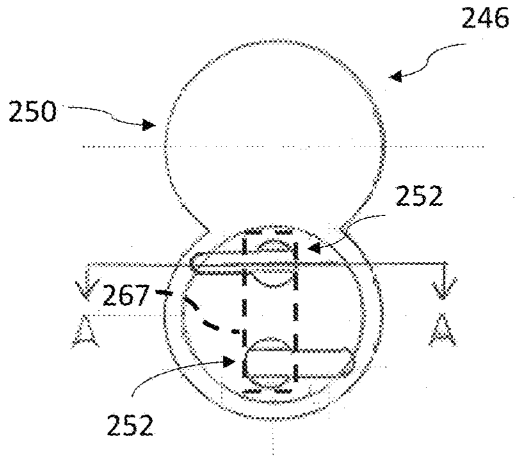
FIG. 23 is a rear view of an interchangeable lock core for use with the key blank of FIG. 20.
Figure 24:
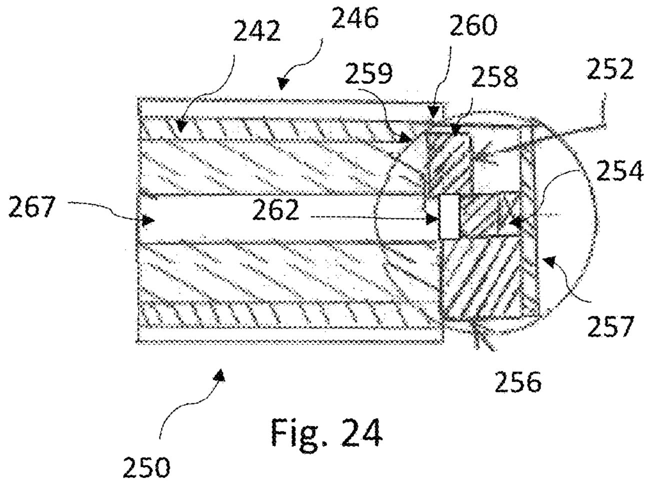
FIG. 24 is a cross-sectional view taken along line A-A of FIG. 23 showing the interchangeable lock core having a shuttle positioned and sized to receive one of the teeth of the key blank of FIG. 20.
Figure 26:
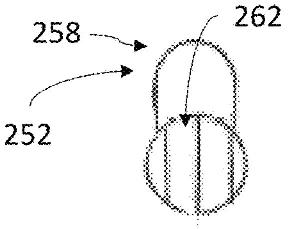
FIG. 26 is a front-end view of the shuttle of FIG. 24.
Figure 27:
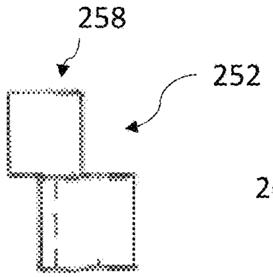
FIG. 27 is a side view of the shuttle of FIG. 24.
Figure 25:
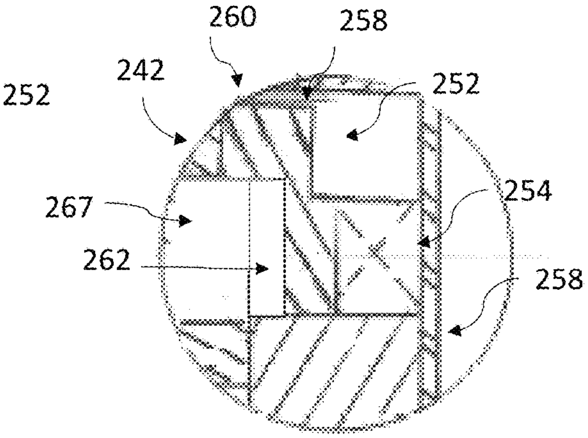
FIG. 25 is an enlarged view of a portion of FIG. 24 showing the shuttle biased forward by a spring and crossing over a shear line between a core body and core plug of the interchangeable lock core to block rotation of the core plug relative to the core body.
Figure 28:
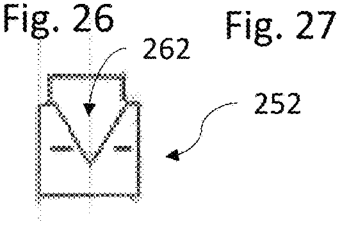
FIG. 28 is another side view of the shuttle of FIG. 24.
Figure 29:
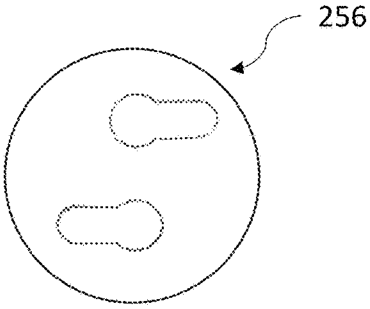
FIG. 29 is a front-end view of a shuttle disk sized to receive the shuttle of FIG. 24.
Figure 30:
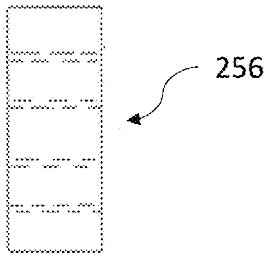
FIG. 30 is a side view of the shuttle disk of FIG. 29.

As shown in FIGS. 20-22, another key blank 210 is provided having a bow 12 and a key shank 214. Key shank 214 has teeth 216 extending from the insertion end. Teeth 216 facilitate unlocking of interchangeable lock core 246 as discussed herein. Although key shank 214 is illustrated as not tapered or bitted, key shank 214 may be tapered (right and left sides and top) and bitted as discussed herein for key shank 14 (e.g. see taper 8 in FIG. 20 shown in phantom for the right side).

Interchangeable lock core 246 includes a core plug 242, a core body 250, two rear shuttles 252, springs 254 (one shown), rear shuttle disk 256, and back plate 257. Rear shuttles 252 can be moved forward and back relative to core plug 242 and core body 250. When positioned forward, a rounded end 258 of respective rear shuttles 252 are received in rounded recesses 260 of core body 250 that are sized to match rounded ends 258 and rounded ends 258 cross a shear line 259 between core plug 242 and core body 250, blocking rotation of core plug 242 relative to core body 250. When positioned rearward, rounded ends 258 of rear shuttles 252 are no longer received in rounded recesses 260 of core body 250 and rounded ends 258 no longer cross shear line 259, permitting rotation of core plug 242 relative to core body 250. Springs 254 urge rear shuttles 252 to the forward position to normally block rotation of core plug 242 relative to core body 250.

Rear shuttles 252 further includes receptacle 262 sized to receive teeth 216. Receptacles 262 include recesses 264 sized to receive teeth 216. When a key blank 210 with teeth 216 that match the size, orientation, shape (e.g. triangle), vertical position, thickness, etc. of recesses 264 is fully inserted into recess 267 of core plug 242, rear shuttles 252 are pushed rearward, permitting unlocking of interchangeable lock core 246. Teeth 216 may be other sizes, orientations, shapes, vertical positions, etc. than those shown. For example, teeth 216 may be smaller or larger, at different orientation (for example rotated so the tips of teeth 216 are not parallel to the tops and bottoms of key shank 214), shapes other than triangles (cones, etc.), higher or lower on key shank 214, etc. Correspondingly, recesses 267 may be other sizes, orientations, shapes, vertical positions, etc. to match these alterative embodiment teeth. According to an alternative embodiment, only one rear shuttle 252 is provided.

Figure 31:
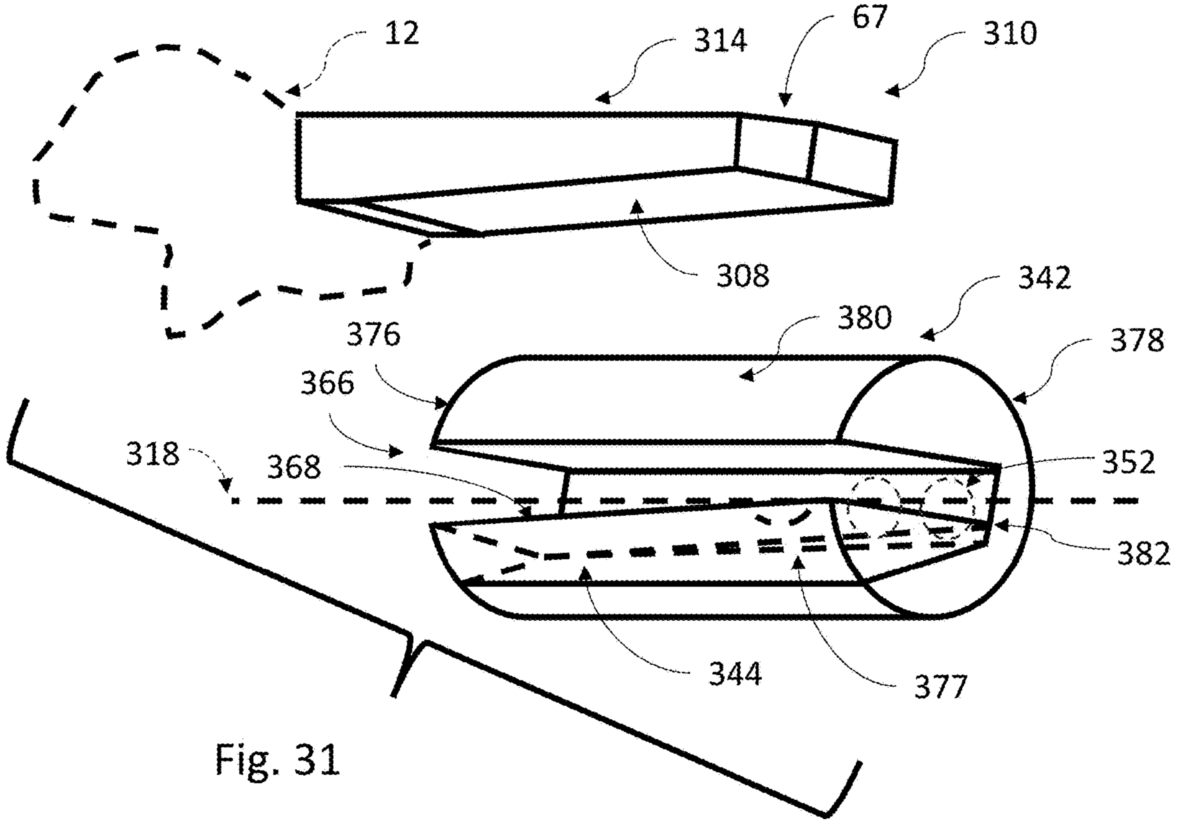
FIG. 31 is a perspective view of a key, core plug, and core plug insert positioned in the core plug.
Figure 32:
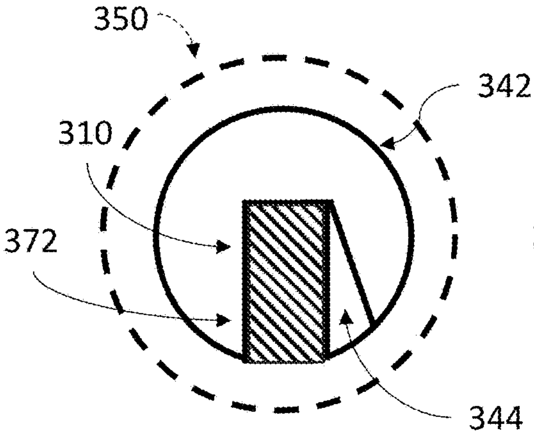
FIG. 32 is an end view of the key, core plug, and core plug insert of FIG. 31.
Figure 33:
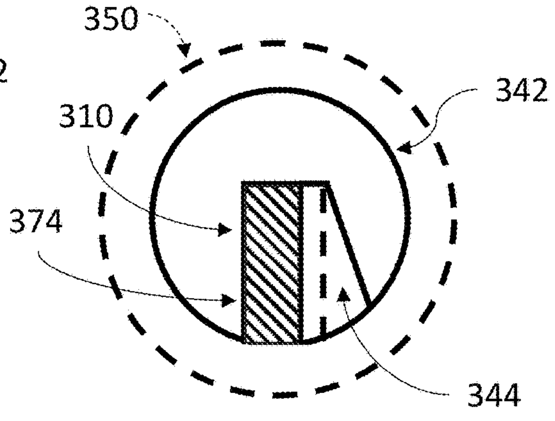
FIG. 33 is another end view of the key, core plug, and core plug of FIG. 31.

As shown in FIG. 31, a key blank/key 310 is sized to fit into keyway 366 defined by a core plug 342 and a core plug insert 344 is positioned in core plug 342. Core plug insert 344 and core plug 342 cooperate to define keyway 366 sized to receive key 310. Core plug insert 344 extends into the portion of keyway 366 defined by core plug 342 and includes a longitudinally extending, tapered surface 368 defining at least a portion of keyway 366, having a first end 372 that is wider than second end 374 as shown in FIGS. 32 and 33.

Core plug 342 and the other core plugs described herein may be used in core bodies, such as those described herein, with or without a core sleeve. Core plug 342 has a longitudinal axis 318, a first end 376, a second end 378 longitudinally spaced apart from first end 376, a cylindrical side wall 380 extending between first and second ends 376, 378 of core plug 342, a plurality of pin-receiving apertures 352 in line with pin- and spring receiving apertures (not shown) of a core body (not shown), keyway 366, and a core plug insert-receiving aperture 382 positioned in side wall 380 between first and second ends 376, 378 of core plug 342. Core plug insert 344 may include one or more injector pin-receiving apertures 377 (in phantom). Keyway 366 has an opened end 384 positioned on first end 376 of core plug 342 sized to receive key 310.

Key 310 has a bow 12 and a shank 314 coupled to bow 12. Shank 314 is positioneable in keyway 366. Key 310 has bitting (not shown) configured to interact with the plurality of pins (not shown) to align the plurality of pins so that core plug 342 can rotate relative to core body 350 (in phantom). Key 310 has a longitudinally extending, tapered surface that 308 aligns with longitudinally extending, tapered surface 368 of core plug insert 344.

Core plug insert 344 has a length substantially equal to a length of core plug 342. To assembly core plug insert 344 into core plug insert-receiving aperture 382, core plug insert 344 may be inserted longitudinally or laterally into core plug insert-receiving aperture 382.

Figure 34:
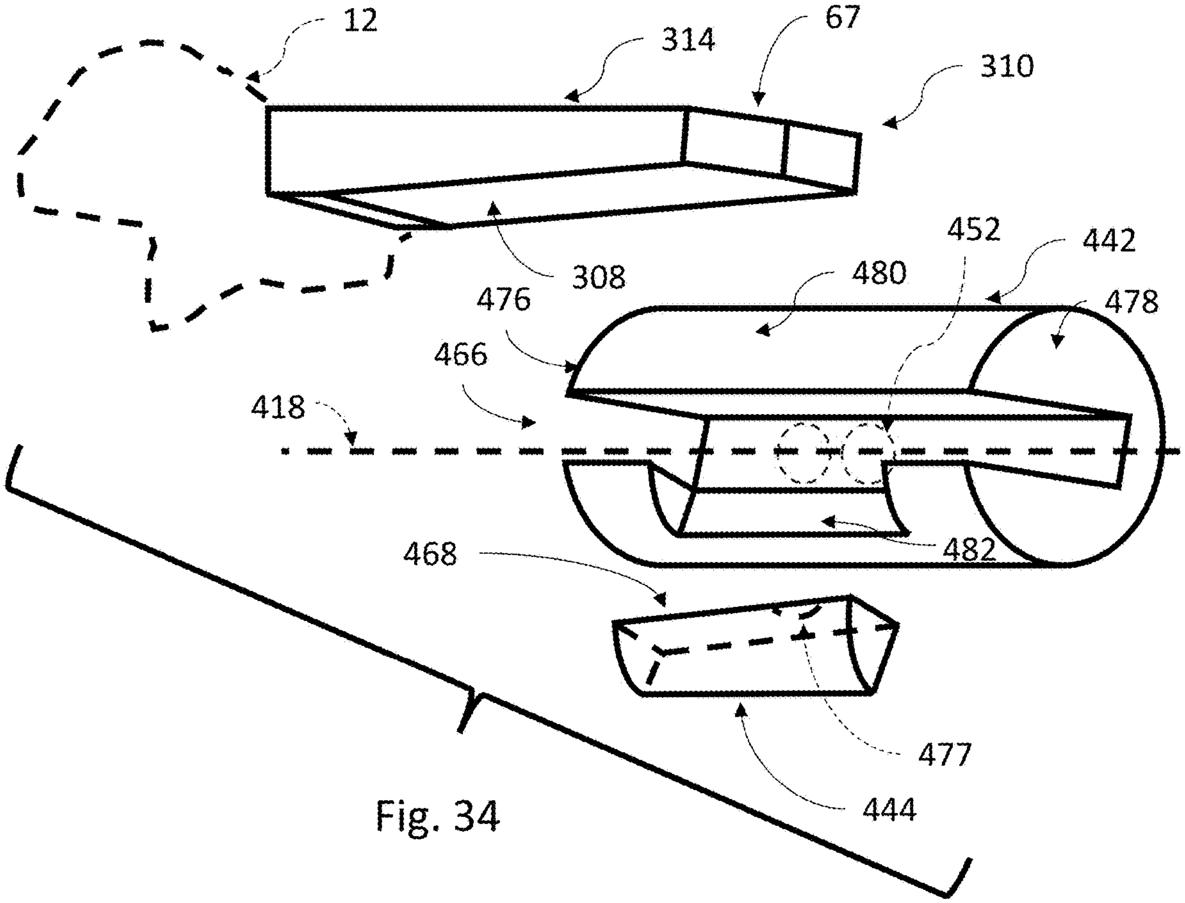
FIG. 34 is a perspective view of another key, core plug, and core plug insert positioned in the core plug.
Figure 35:
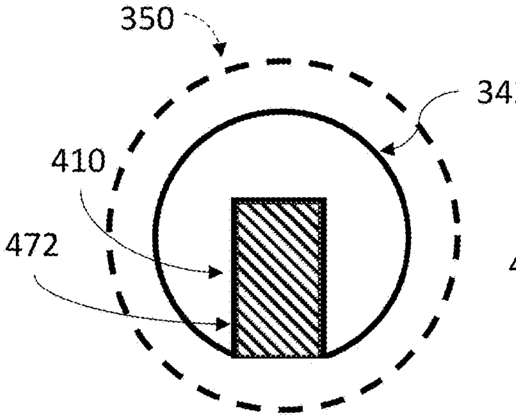
FIG. 35 is an end view of the key, core plug, and core plug insert of FIG. 34.
Figure 36:
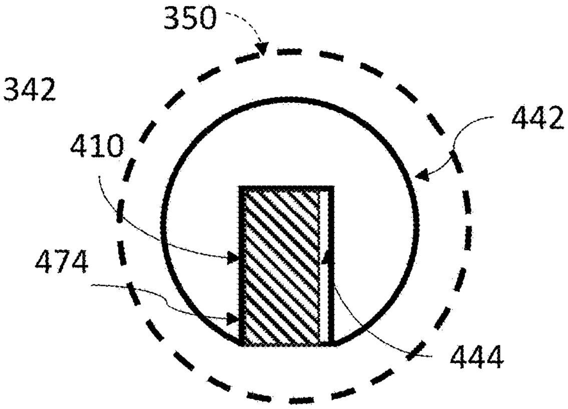
FIG. 36 is another end view of the key, core plug, and core plug of FIG. 34.

As shown in FIG. 34, key blank/key 310 is sized to fit into keyway 466 defined by a core plug 442 and a core plug insert 444 positioned in core plug 442. Core plug insert 444 and core plug 442 cooperate to define keyway 466 sized to receive key 310. Core plug insert 444 extends into core plug 442 and includes a longitudinally extending, tapered surface 468 defining at least a portion of keyway 466, having a first end 472 that is wider than second end 474 as shown in FIGS. 35 and 36.

Core plug 442 has a longitudinal axis 418, a first end 476, a second end 478 longitudinally spaced apart from first end 476, a cylindrical side wall 480 extending between first and second ends 476, 478 of core plug 442, a plurality of pin-receiving apertures 452 in line with pin- and spring receiving apertures (not shown) of a core body (not shown), keyway 466, and a core plug insert-receiving aperture 482 positioned in side wall 480 between first and second ends 476, 478 of core plug 442. Core plug insert 444 may include one or more injector pin-receiving apertures 477.

Keyway 466 has an opened end 384 positioned on first end 476 of core plug 442 sized to receive key 310. Key 310 has longitudinally extending, tapered surface that 308 aligns with longitudinally extending, tapered surface 468 of core plug insert 444.

Core plug insert 444 has a length more than half a length of core plug 442. Core plug insert-receiving aperture 482 forms a notch in core plug 442 so that plug insert-receiving aperture 482 is spaced apart from first and second ends 476, 478 of core plug 442. To assembly core plug insert 444 into core plug insert-receiving aperture 482, core plug insert 444 may be inserted into core plug insert-receiving aperture 482.

Figure 37:
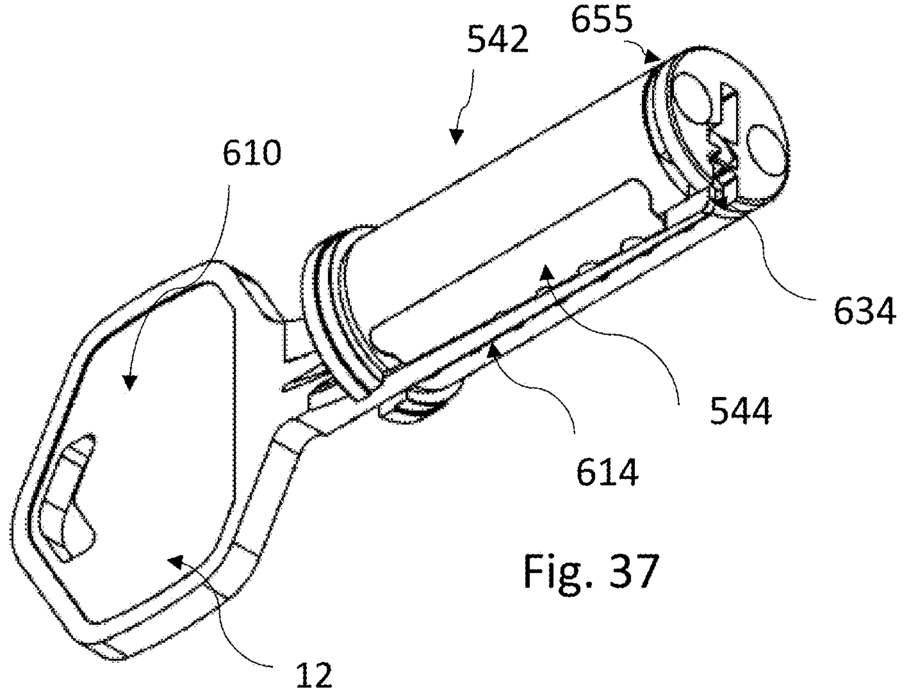
FIG. 37 is a perspective view of another key, core plug, and core plug insert positioned in the core plug.
Figure 38:
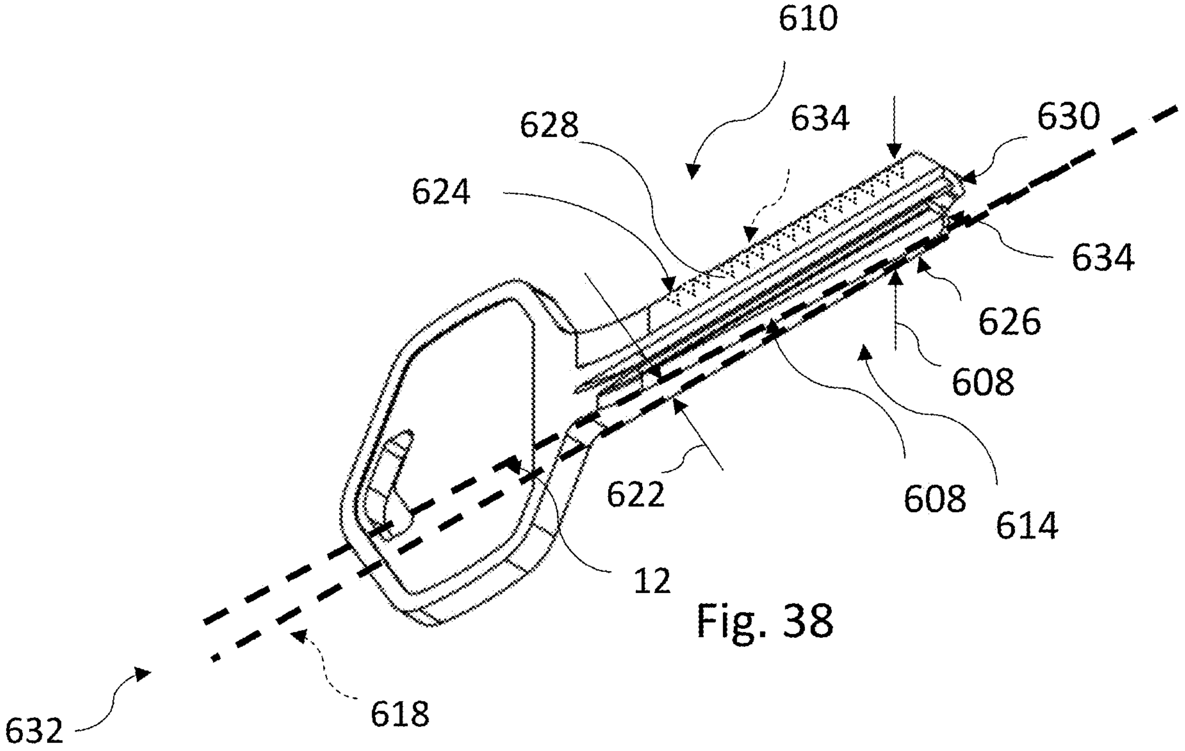
FIG. 38 is a perspective view of the key of FIG. 37.
Figure 39:
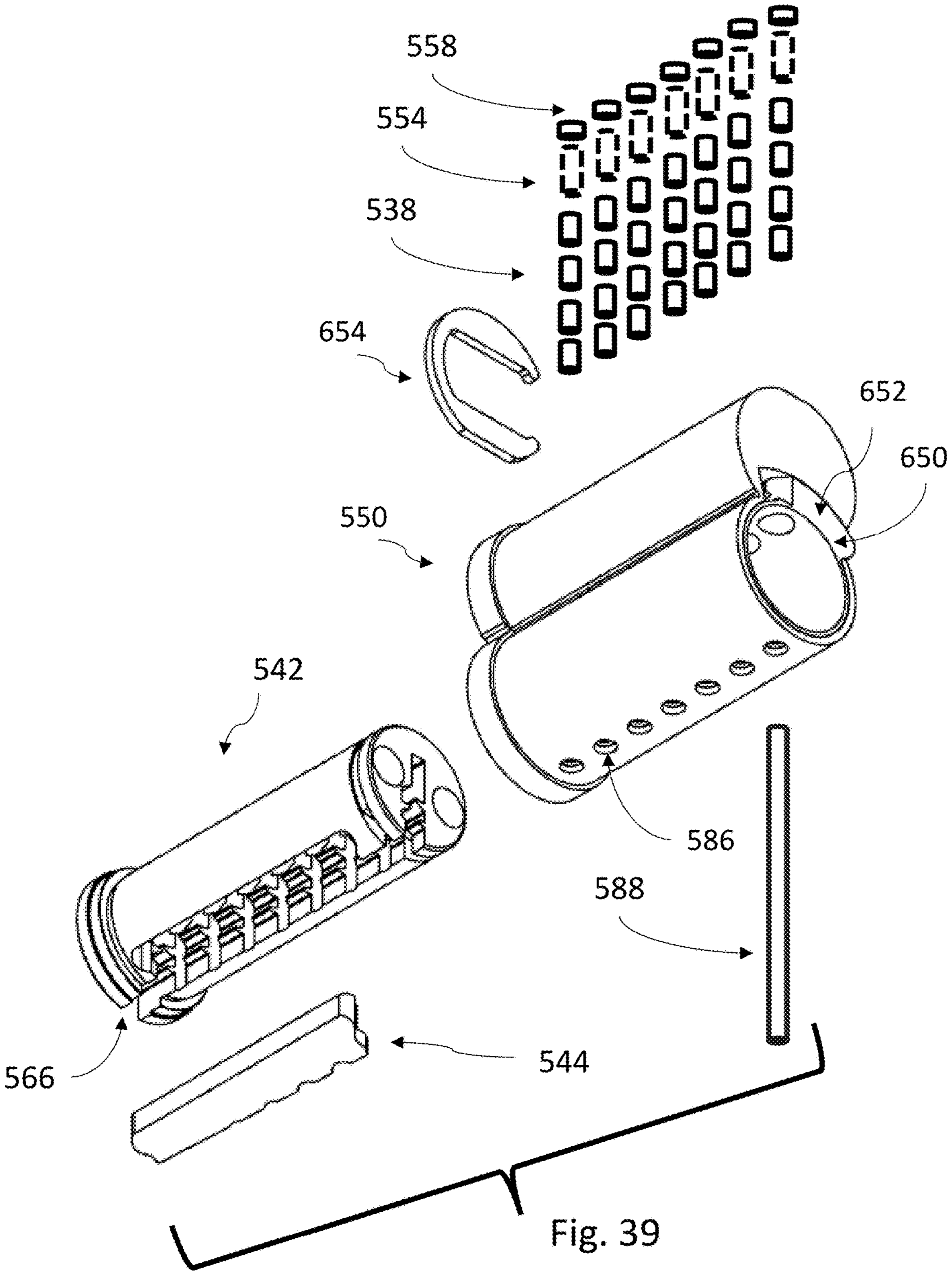
FIG. 39 is an assembly view of an interchangeable lock core assembly including the core plug and core plug insert of FIG. 37.
Figure 40:
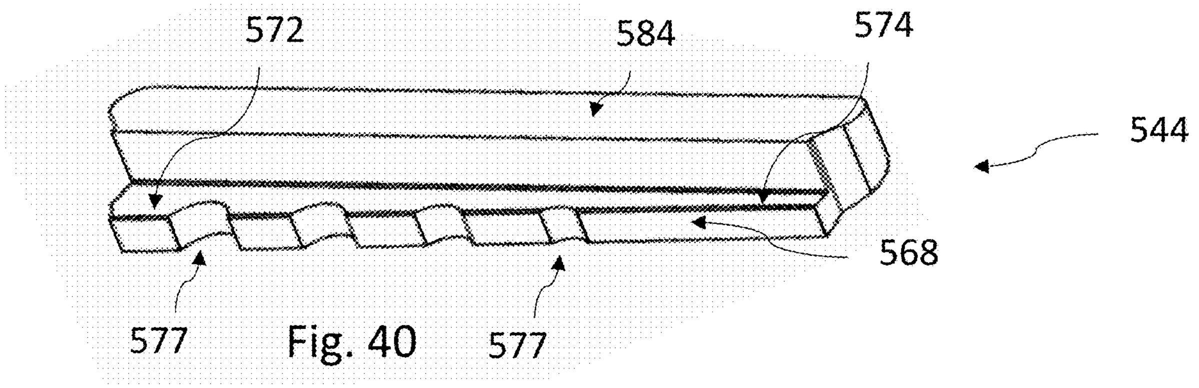
FIG. 40 is a perspective view of the core plug insert of FIG. 37.
Figure 41:
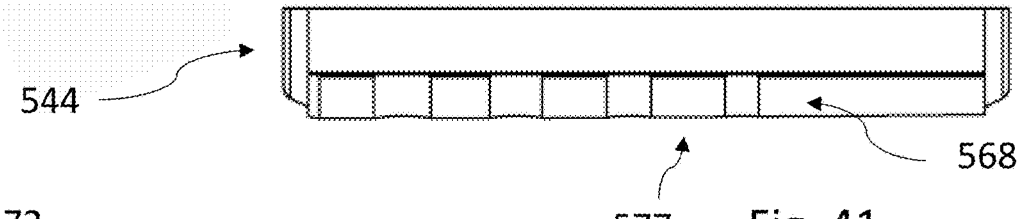
FIG. 41 is a side view of the core plug insert of FIG. 37.
Figure 42:
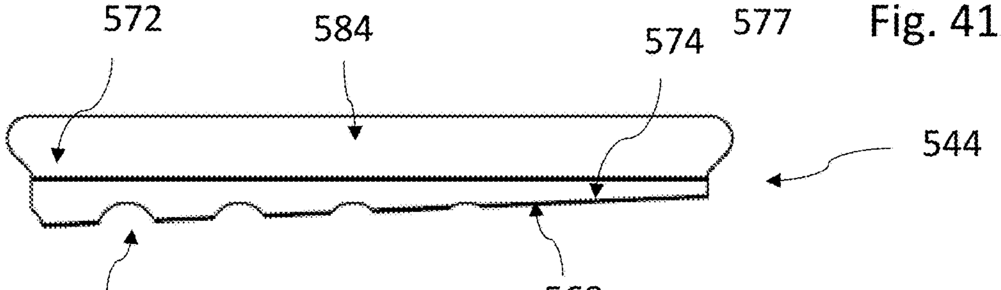
FIG. 42 is another side view of the core plug insert of FIG. 37.
Figure 43:
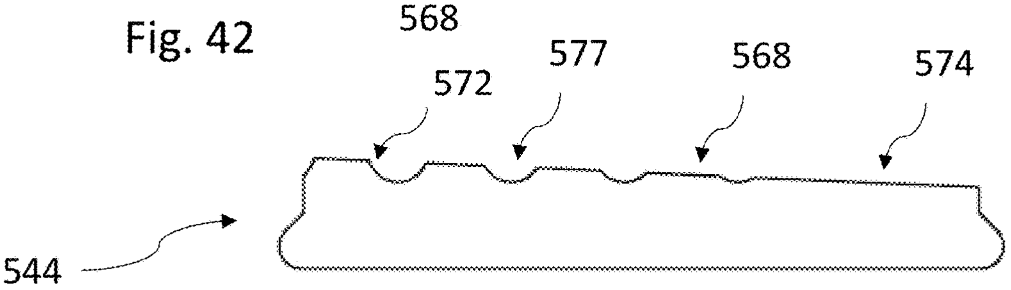
FIG. 43 is another side view of the core plug insert of FIG. 37 opposite the view of FIG. 42.
Figure 44:
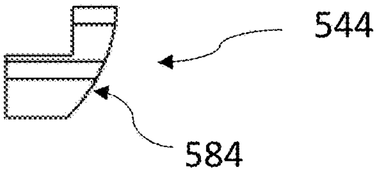
FIG. 44 is an end view of the core plug insert of FIG. 37.
Figure 45:
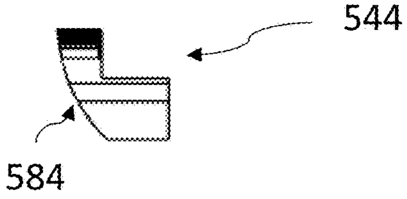
FIG. 45 is another end view of the core plug insert of FIG. 37 opposite the view of FIG. 44.

As shown in FIG. 37, key blank/key 610 is sized to fit into a keyway 566 defined by a core plug 542 and a core plug insert 544 positioned in core plug 542. Core plug insert 544 and core plug 542 cooperate to define keyway 566 sized to receive key 610. Core plug insert 544 extends into core plug 542 and includes a longitudinally extending, tapered surface/taper 568, as shown in FIGS. 40-43, defining at least a portion of keyway 566, having a first end 572 that is wider than second end 574 as shown in FIGS. 40, 42, and 43.

Key 610, and the other keys described herein, may have a bow 12 and a shank 614 coupled to bow 12. Shank 614 is positioneable in keyway 566. Key 610 has bitting 634 configured to interact with plurality of pins 538 and to align plurality of pins 538 so that core plug 542 can rotate relative to a core body 550. Key 610 has a longitudinally extending, tapered surface 608 that aligns with longitudinally extending, tapered surface 568 of core plug insert 544. Longitudinally extending, tapered surface 608 may be spaced apart from bow 12 of key 610. Bow 12 is coupled to a first end 616 of shank 614 and shank 614 includes a tapered corner 667 positioned on a second end 619 of shank 614 opposite first end 616 of shank 614. Shank 614 has a length and longitudinally extending, tapered surface 608 has a length that is at least one quarter (25%) of the length of shank 614. Tapered surface 608 may have other lengths relative to the length of shank 614, such as 5% or less, 10%, 15%, 20% 33%, 40%, 50%, 65%, 75%, 85%, 95%, 100%, or more. Similarly, tapered surface 568 of core plug insert 544 and core plug insert 544 itself may have a length that is at least one quarter (25%) of the length of shank 614. Tapered surface 568 of core plug insert 544 and core plug insert 544 itself may have other lengths relative to the length of shank 614, such as 5% or less, 10%, 15%, 20% 33%, 40%, 50%, 65%, 75%, 85%, 95%, 100%, or more.

Shank 614 of key 610, and the other keys described herein, may also have a height 620 and a taper 608 defining longitudinally extending, tapered surface 608 has a thickness 622 that decreases along a length of shank 614. Shank 614 has a top 624, a bottom 626, a first side 628 extending between top 624 and bottom 626, and a second side 630 opposite first side 628 and extending between top 624 and bottom 626. Height 620 extends between top 624 and bottom 626. Longitudinally extending, tapered surface 608 may be positioned on at least one of top 624, bottom 626, and/or first and second sides 628, 630. Shank 614 has a longitudinal axis 618 and longitudinally extending, tapered surface 608 and longitudinal axis 618 cooperate to define an angle 632. Key 614, and the other keys described herein, may have a blunt edge 636 that strikes clip 654 to stop further insertion of key 610 into keyway 566 to bitting 634 with pins 538 to form a key stop. According to other embodiments, the engagement of tapered surface 608 of key 610 with tapered surface 568 of core plug insert 544 stop further insertion of key 610 to form a key stop.

As shown in FIGS. 48, 49, and 63-67, core plug 542 has a longitudinal axis 518, a first end 576, a second end 578 longitudinally spaced apart from first end 576, a cylindrical side wall 580 extending between first and second ends 576, 578 of core plug 542, a plurality of pin-receiving apertures 552 in line with pin- and spring receiving apertures 552 of a core body 550, keyway 566, and a core plug insert-receiving aperture 582 positioned in side wall 580 between first and second ends 576, 578 of core plug 542. Core plug insert 544 may include one or more injector pin-receiving apertures 577.

Core plug insert 544 has a length more than half a length of core plug 542. Core plug insert-receiving aperture 582 forms a notch in core plug 542 so that plug insert-receiving aperture 582 is spaced apart from first and second ends 576, 578 of core plug 542. To assembly core plug insert 544 into core plug insert-receiving aperture 582, core plug insert 544 may be inserted into core plug insert-receiving aperture 582. Core plug insert 544, and the other core plug inserts described herein, preferably have a cylindrical surface 584 to match cylindrical sidewall 580 of core plug 542 to facilitate rotation of core plug 542.

Figure 68:
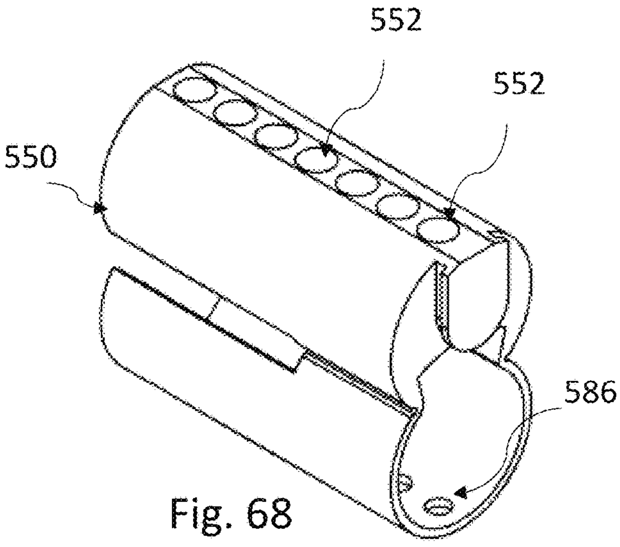
FIG. 68 is a perspective view of a core body of the interchangeable lock core assembly of FIG. 39.
Figure 69:
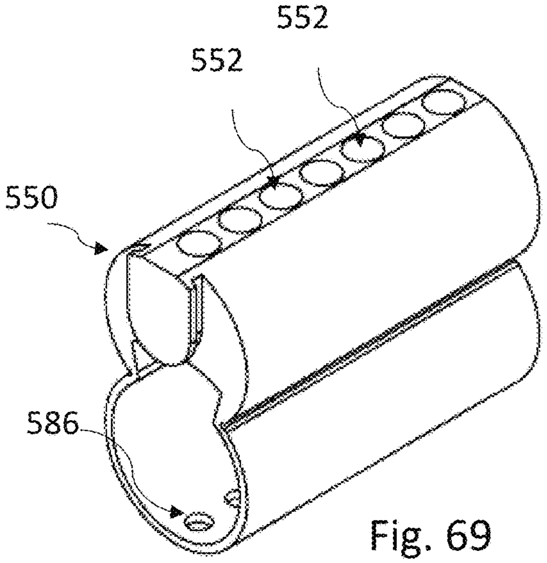
FIG. 69 is a view similar to FIG. 66 from another angle.

As shown in FIGS. 68 and 69 for core body 550, and other core bodies suitable for use with the core plugs described herein, may have a plurality of pin- and spring-receiving apertures 552 and a plurality of ejector pin-receiving apertures 586 in line with plurality of pin- and spring-receiving apertures 552 and sized to receive an ejector pin 588. Interchangeable lock core and key assembly 500 includes a plurality of pins 538 positionable in pin- and spring-receiving apertures 552 of core body 550 and pin-receiving apertures 552 of core plug 542. Assembly 500 also includes a plurality of springs 554 positioned in pin- and spring-receiving apertures 552 of core body 550 to urge plurality of pins 538 towards core plug 542.

Figure 70:
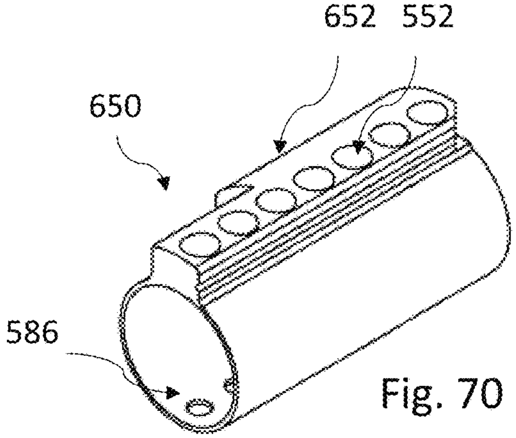
Figure 71:
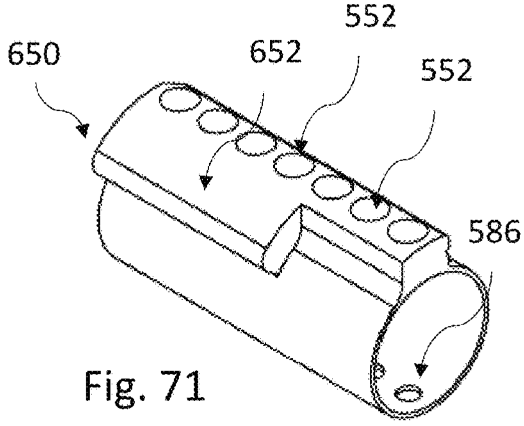
FIG. 71 is a perspective view of a core sleeve of the interchangeable lock core assembly of FIG. 39.
Figure 73:
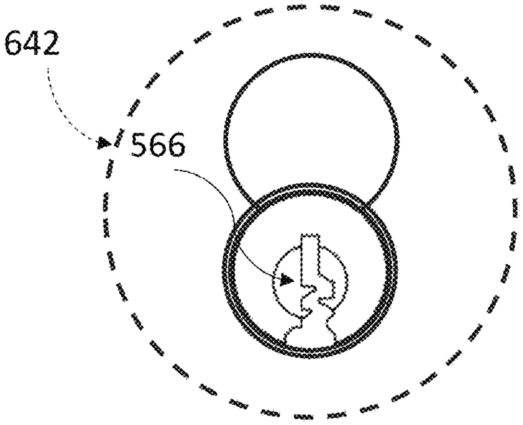
FIG. 73 is a perspective view of a core face of the interchangeable lock core assembly of FIG. 39.

As shown in FIGS. 70 and 71, core sleeve 650, and other core sleeve suitable for use with the core plugs described herein, may have a plurality of pin- and spring-receiving apertures 552 and a plurality of ejector pin-receiving apertures 586 in line with plurality of pin- and spring-receiving apertures 552 and sized to receive an ejector pin 588. To remove interchangeable lock core and key assembly 500, a core key (not shown) is inserted into keyway 566 to allow rotation of core sleeve 650 relative to core body 550, retracting a lug 652 of core sleeve 650 from a housing 642, such as a door handle, mortise lock, cylinder lock housing, padlock housing, etc., in which assembly 550 is inserted, allowing assembly 500 to be removed from housing 642 shown in FIG. 73. According to alternative embodiments of the present disclosure, lock core assemblies may not include core sleeve, such as lock core assemblies known as "large format" lock core assemblies.

Figure 72:
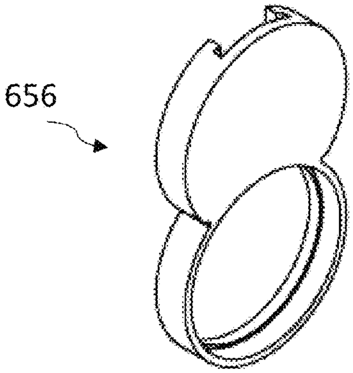
FIG. 72 is view similar to FIG. 71 from another angle.

Core plug 542 and core sleeve 650 are retained on core body 550 with a clip 654 sized to be positioned in an annular groove 655 in core plug 542. Core body 550 and core sleeve 650 are partially covered by a core face 656 shown in FIG. 72. During assembly, core sleeve 650 is positioned in core body 550, core plug 542 is inserted into core sleeve 650, core face 656 is slid onto core body 550, and clip 654 is secured to core plug 542. Pins 538 and springs 554 may then be positioned into pin- and spring-receiving apertures 52 to match bitting 634 to be provided on keys 610. Pins 538 and spring 554 are retained by core caps 558. To recombinate pins 538 to match different bitting 634 provided on keys 610, pins 538 may be removed by inserting an ejector pin 588 into ejector pin-receiving apertures 586 of core body 550 and core sleeve 650 to knock out core caps 558, springs 554, and pins 538.

During manufacturing, core body 550, core sleeve 650, and core plug 542, core sleeve, and core plugs discussed herein, are preferably machined of brass or other metals and core plug insert 544 is metal injected molded. According to other manufacturing processes, core plugs, core bodies, core plugs, and core plugs inserts may be machined, metal injected molded, powdered casts, die cast, etc.

Figure 46:
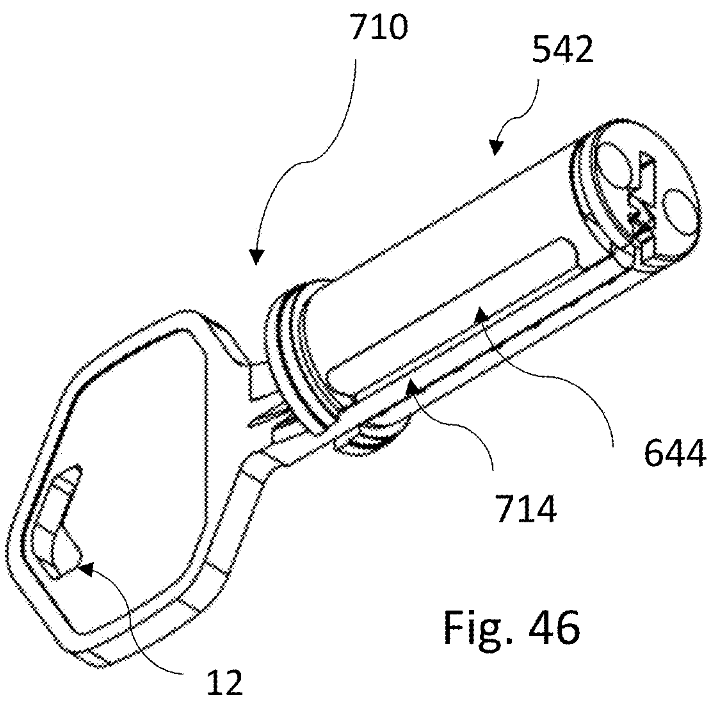
FIG. 46 is a perspective view of another key, core plug, and core plug insert positioned in the core plug.
Figure 47:
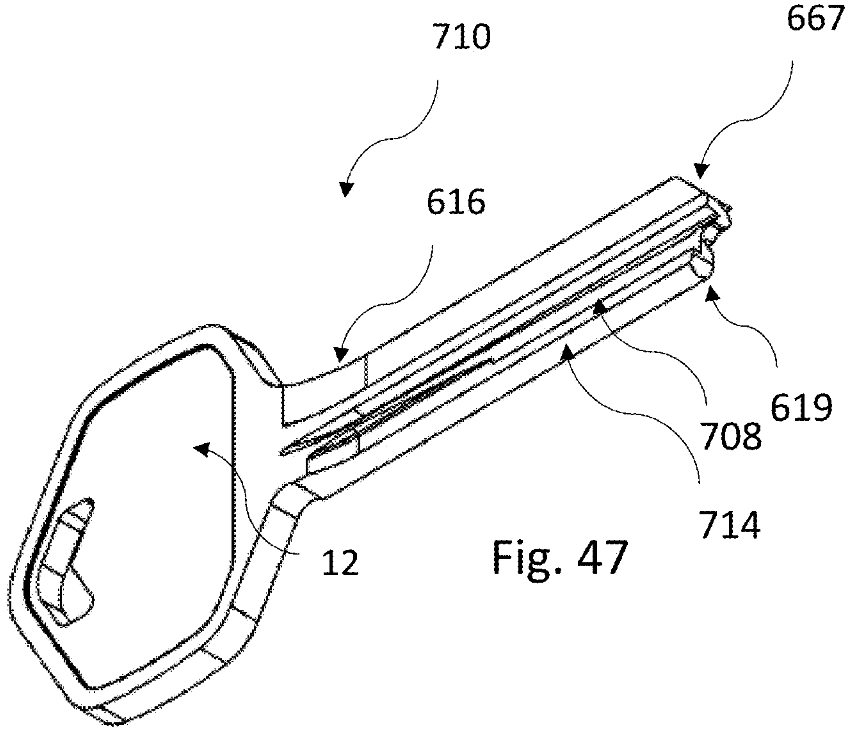
FIG. 47 is a perspective view of the key of FIG. 46.
Figure 48:
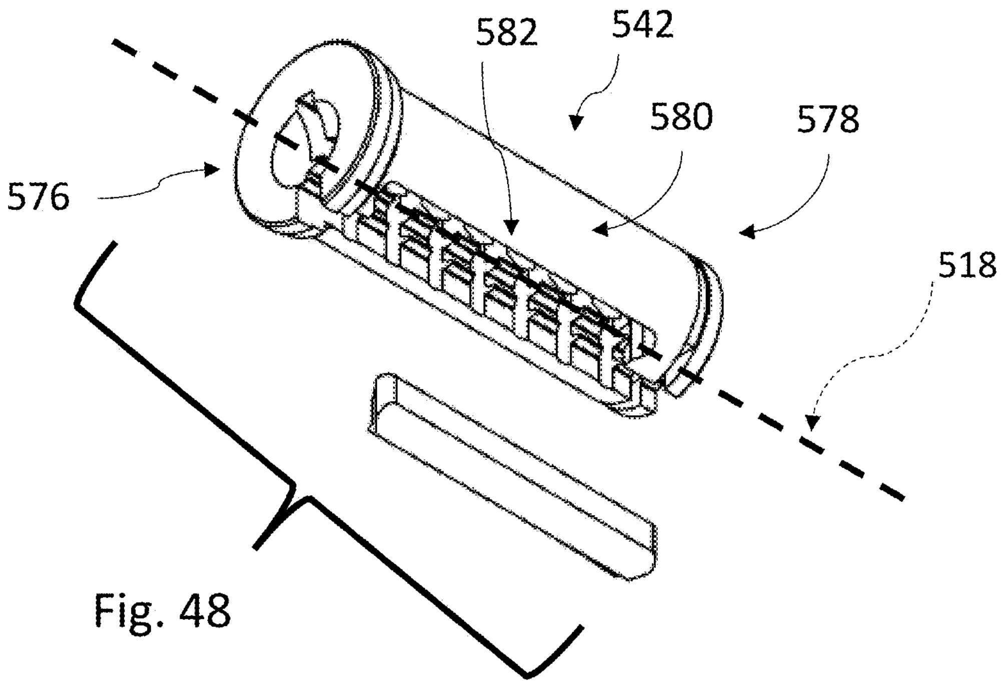
FIG. 48 is a perspective view of the core plug of FIG. 37 and another core plug insert.
Figure 49:
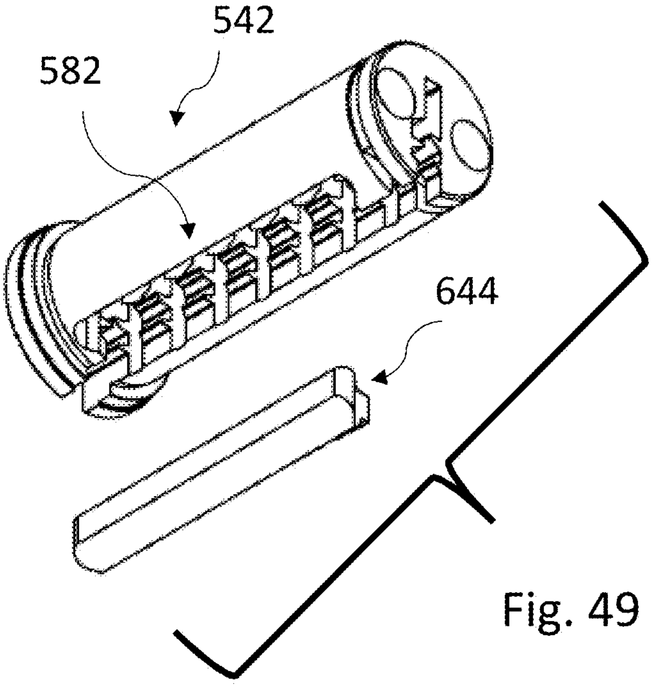
FIG. 49 is a view similar to FIG. 48 from another angle.
Figure 50:
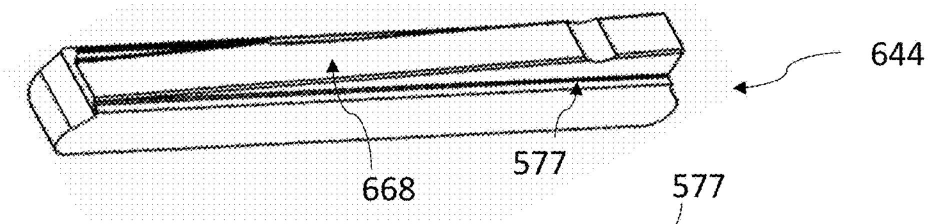
FIG. 50 is a perspective view of the core plug insert of FIG. 48.
Figure 51:
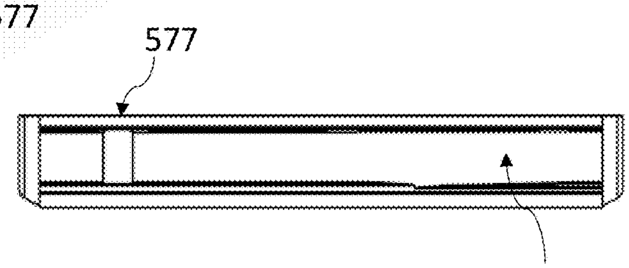
FIG. 51 is a side view of the core plug insert of FIG. 48.
Figure 52:
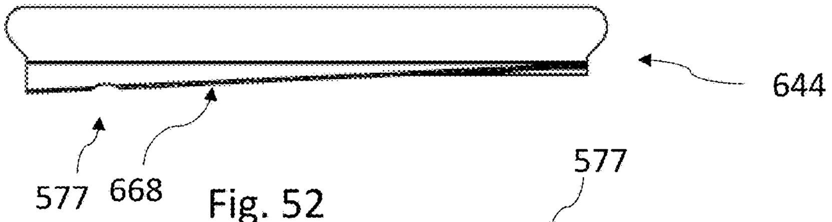
FIG. 52 is another side view of the core plug insert of FIG. 48.
Figure 53:
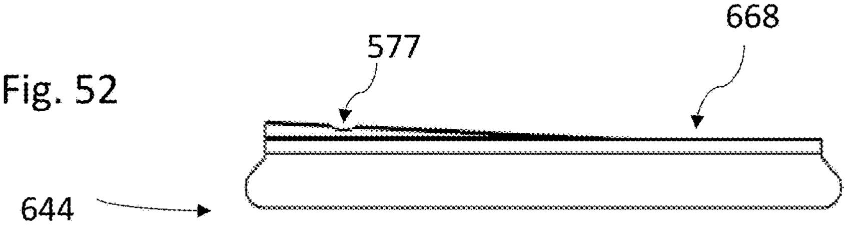
FIG. 53 is another side view of the core plug insert of FIG. 48 opposite the view of FIG. 52.
Figure 54:
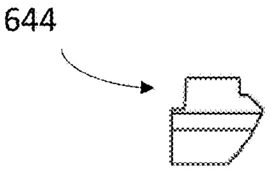
FIG. 54 is an end view of the core plug insert of FIG. 48.
Figure 55:
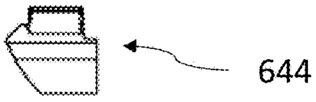
FIG. 55 is another end view of the core plug insert of FIG. 48 opposite the view of FIG. 54.
Figure 56:
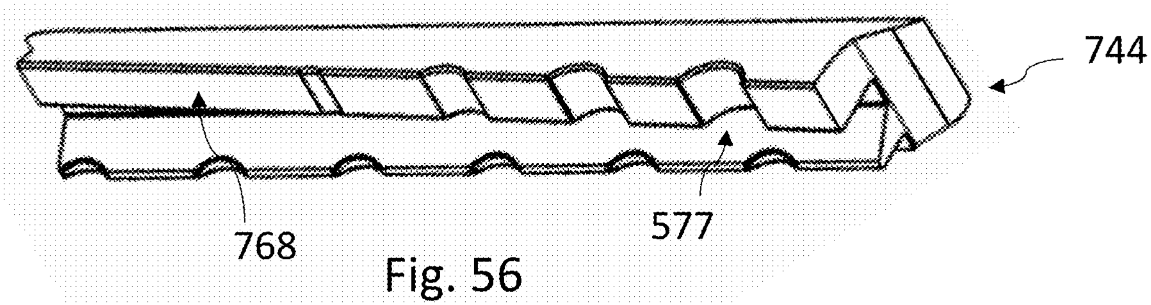
FIG. 56 is a perspective view of another core plug insert.
Figure 57:
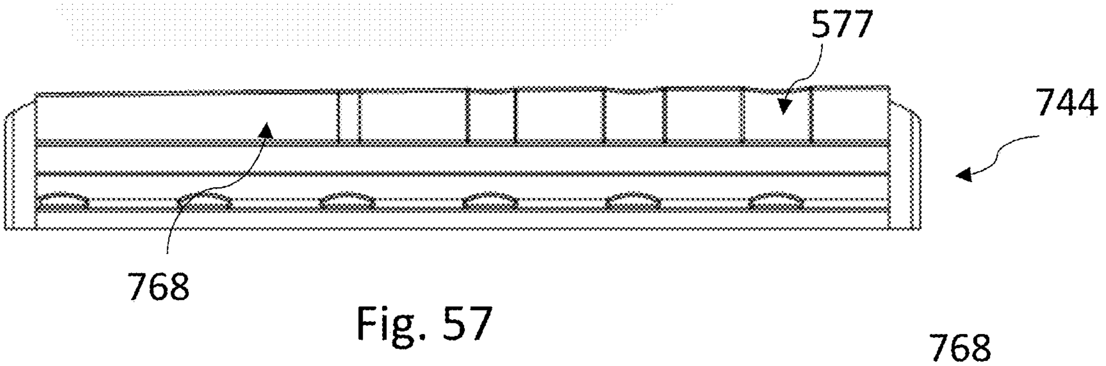
FIG. 57 is a side view of the core plug insert of FIG. 56.
Figure 58:
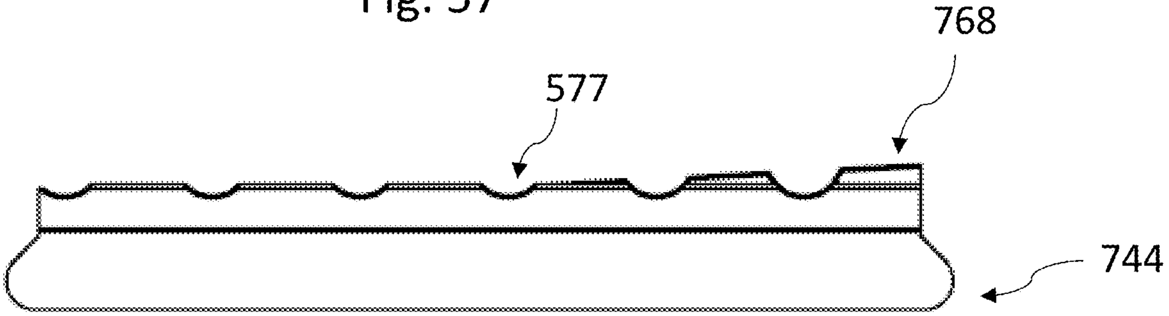
FIG. 58 is another side view of the core plug insert of FIG. 56.
Figure 59:
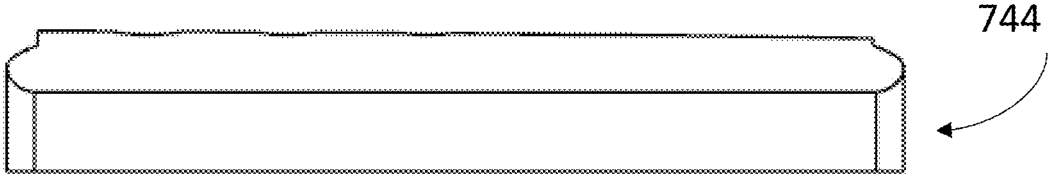
FIG. 59 is another side view of the core plug insert of FIG. 56 opposite the view of FIG. 58.
Figure 60:
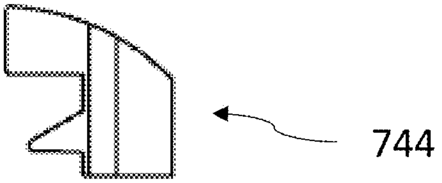
FIG. 60 is an end view of the core plug insert of FIG. 56.
Figure 61:
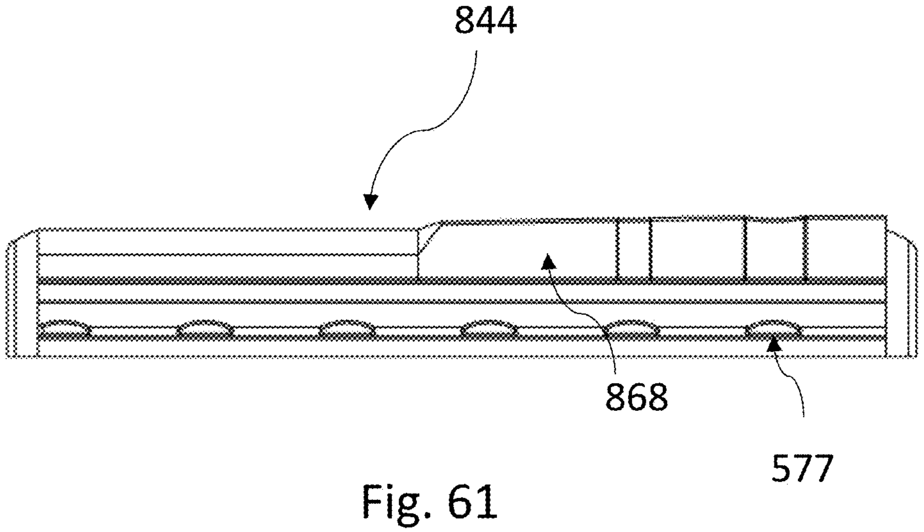
FIG. 61 is side view of another core plug insert.
Figure 62:
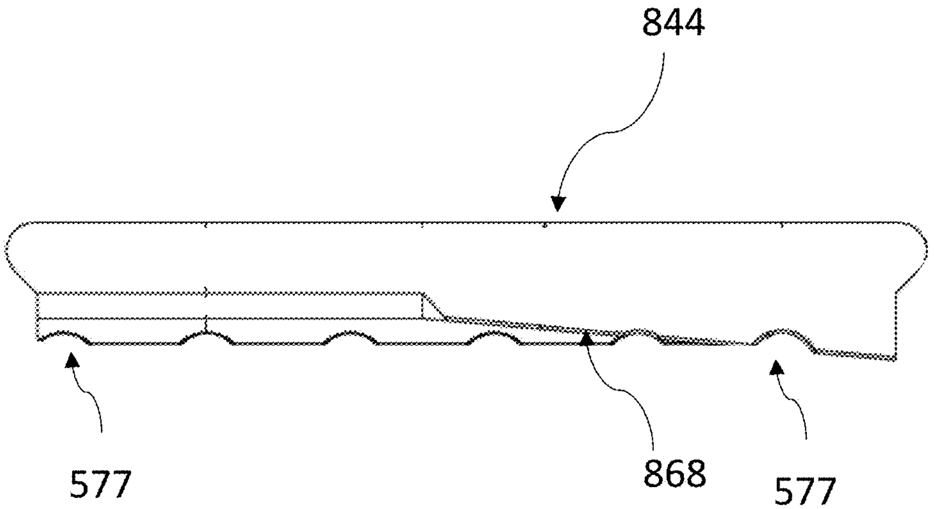
FIG. 62 is another side view of the core plug insert of FIG. 61.
Figure 63:
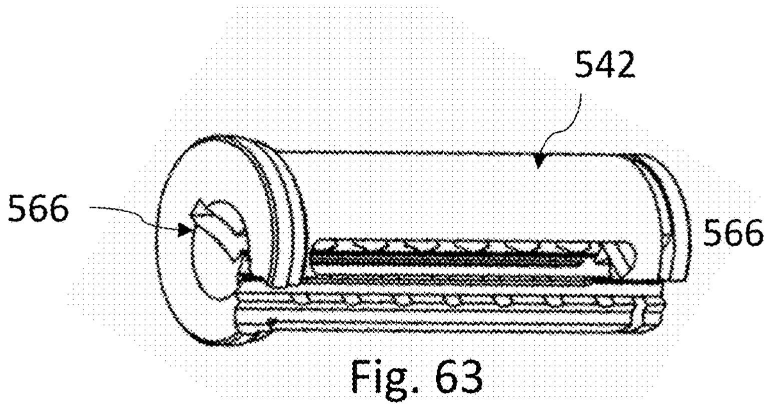
FIG. 63 is a perspective view of the core plug of FIG. 37.
Figure 64:
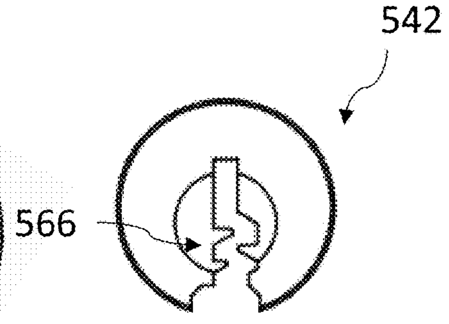
FIG. 64 is an end view of the core plug of FIG. 37.
Figure 65:
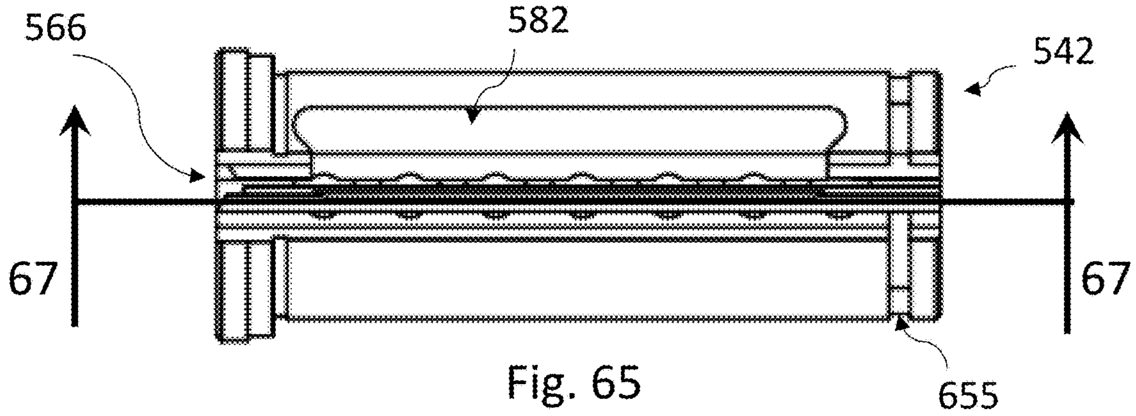
FIG. 65 is side view of the core plug of FIG. 37 showing a core plug insert-receiving aperture.
Figure 66:
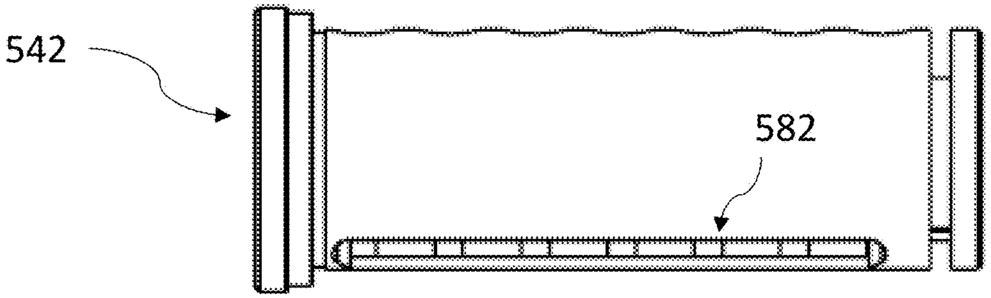
FIG. 66 is another side view of the core plug insert of FIG. 37.
Figure 67:
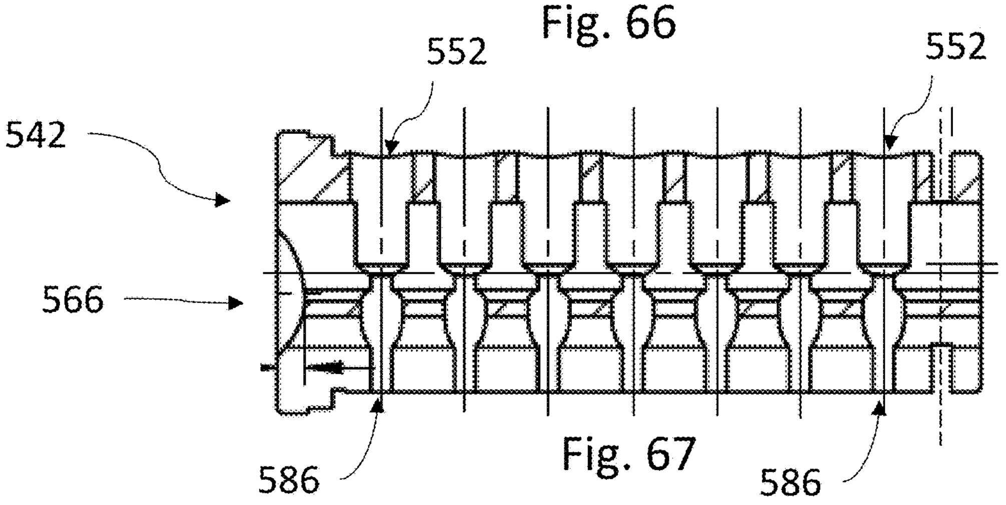
FIG. 67 is a cross-sectional view of the core plug of FIG. 37 taken along line 67-67 of FIG. 65.

An alternative embodiment core plug insert 644 is shown in FIGS. 46 and 48-55 for use with key 710 of FIGS. 46 and 47 with shank 714 having a longitudinally extending, tapered surface 708 that aligns with longitudinally extending, tapered surface 668 of core plug insert 644. Another alternative embodiment core plug insert 744 is shown in FIGS. 56-60 with longitudinally extending, tapered surface 768. Another alternative embodiment core plug insert 844 is shown in FIGS. 61 and 62 with longitudinally extending, tapered surface 868 having a length of about half of the length of insert 844. Core plug inserts 544, 644, 744, 844 each fit within core plug insert-receiving aperture 582 of core plug 542. As such, keyways with different tapers of different lengths and/or different angles to match different keys can all be used with core plug 542 by providing different core plug inserts having different tapers of different lengths and/or different angles.

The invention claimed is:

1. An interchangeable lock core and key assembly comprising a core body having a plurality of pin- and spring-receiving apertures and a plurality of ejector pin-receiving apertures in line with the plurality of pin- and spring-receiving apertures and sized to receive an ejector pin, a core plug positioned in the core body and having a longitudinal axis, a first end, a second end longitudinally spaced apart from the first end, a side wall extending between the first and second ends of the core plug, a plurality of pin-receiving apertures in line with the pin- and spring receiving apertures of the core body, a keyway, and a core plug insert-receiving aperture positioned in the side wall between the first and second ends of the core plug, the keyway having an opened end positioned on the first end of the core plug and sized to receive a key, a plurality of pins positioned in the pin- and spring-receiving apertures of the core body and the pin-receiving apertures of the core plug, a plurality of springs positioned in the pin- and spring-receiving apertures of the core body to urge the plurality of pins towards the core plug, a core plug insert positioned in the core plug insert-receiving aperture and having a longitudinally extending, tapered surface defining at least a portion of the keyway, and a key having a bow and a shank coupled to the bow, the shank being positioned in the keyway, the key having bitting configured to interact with the plurality of pins to align the plurality of pins so that the core plug can rotate relative to the core body and a longitudinally extending, tapered surface that aligns with the longitudinally extending, tapered surface of the core plug insert.

2. The interchangeable lock core and key assembly of claim 1, wherein the longitudinally extending, tapered surface is spaced apart from the bow of the key.

3. The interchangeable lock core and key assembly of claim 1, wherein the bow is coupled to a first end of the shank and the shank includes a tapered corner positioned on a second end of the shank opposite the first end of the shank.

4. The interchangeable lock core and key assembly of claim 1, wherein the shank has a length and the longitudinally extending, tapered surface has a length that is at least one quarter of the length of the shank.

5. The interchangeable lock core and key assembly of claim 1, wherein the shank has a length and a height and the longitudinally extending, tapered surface is defined by a taper that has a thickness that decreases along the length of the shank.

6. The interchangeable lock core and key assembly of claim 5, wherein the shank has a top, a bottom, a first side extending between the top and the bottom, and a second side extending between the top and bottom, the second side being opposite the first side, the height extending between the top and bottom, and the longitudinally extending, tapered surface taper is positioned on at least one of the first and second sides.

7. The interchangeable lock core and key assembly of claim 1, wherein the shank has a length and a longitudinal axis and the longitudinally extending, tapered surface and the longitudinal axis cooperate to define an angle between about 3 degrees and about 25 degrees.

8. The interchangeable lock core and key assembly of claim 7, wherein the angle is between 8 degrees and 15 degrees.

9. The interchangeable lock core and key assembly of claim 1, wherein the core plug insert-receiving aperture is spaced apart from the first and second ends of the core plug.

10. An interchangeable lock core and key assembly comprising a core body having a plurality of pin- and spring-receiving apertures and a plurality of ejector pin-receiving apertures in line with the plurality of pin- and spring-receiving apertures and sized to receive an ejector pin, a core plug positioned in the core body an having a longitudinal axis, a first end, a second end longitudinally spaced apart from the first end, a longitudinal length extending from the first end of the core plug to the second end of the core plug, a side wall extending between the first and second ends of the core plug, a plurality of pin-receiving apertures in line with the pin- and spring-receiving apertures of the core body, a keyway, and a core plug insert-receiving aperture positioned in the side wall between the first and second ends of the core plug, the keyway having an opened end positioned on the first end of the core plug and sized to receive a key, a plurality of pins positioned in the pin- and spring-receiving apertures of the core body and the pin-receiving apertures of the core plug, a plurality of springs positioned in the pin- and spring-receiving apertures of the core body to urge the plurality of pins towards the core plug, a core plug insert positioned in the core plug insert-receiving aperture having a longitudinally extending, tapered surface defining at least a portion of the keyway, the longitudinally extending, tapered surface of the core plug insert having a longitudinal length of at least a quarter of the length of the length of the core plug, and a key having a bow and a shank, the shank being positioned in the keyway, the key having bitting configured to interact with the plurality of pins to align the plurality of pins so that the core plug can rotate relative to the core body and a longitudinally extending, tapered surface that aligns with the longitudinally extending, tapered surface of the core plug insert.

11. The interchangeable lock core and key assembly of claim 10, wherein the core plug insert-receiving aperture is spaced apart from the first and second ends of the core plug.

12. The interchangeable lock core and key assembly of claim 10, wherein the shank includes a first end coupled to the bow and a second end spaced apart from the first end and the longitudinally extending, tapered surface of the core plug insert is spaced apart from the second end of the shank.

13. The interchangeable lock core and key assembly of claim 10, wherein the shank has a length and the longitudinally extending, tapered surface has a length that is at least one quarter of the length of the shank.

14. The interchangeable lock core and key assembly of claim 1, wherein the shank has a length and a height and the longitudinally extending, tapered surface is defined by a taper that has a thickness that decreases along the length of the shank.

15. The interchangeable lock core and key assembly of claim 5, wherein the shank has a top, a bottom, a first side extending between the top and the bottom, and a second side extending between the top and bottom, the second side being opposite the first side, the height extending between the top and bottom, and the longitudinally extending, tapered surface taper is positioned on at least one of the first and second sides.

16. The interchangeable lock core and key assembly of claim 1, wherein the shank has a length and a longitudinal axis and the longitudinally extending, tapered surface and the longitudinal axis cooperate to define an angle between about 8 degrees and about 15 degrees.

17. The interchangeable lock core and key assembly of claim 1, wherein the core plug insert-receiving aperture is spaced apart from the first and second ends of the core plug.

* * * * *